United States Patent
Li

(10) Patent No.: US 7,389,096 B2
(45) Date of Patent: Jun. 17, 2008

(54) MONITORING SYSTEM USING MULTI-ANTENNA TRANSCEIVERS

(75) Inventor: Shaolin Li, Fremont, CA (US)

(73) Assignee: Bellow Bellows LLC, Los Altos, CA (US)

(*) Notice: Subject to any disclaimer, the term of this patent is extended or adjusted under 35 U.S.C. 154(b) by 743 days.

(21) Appl. No.: 10/820,963

(22) Filed: Apr. 7, 2004
(Under 37 CFR 1.47)

(65) Prior Publication Data
US 2005/0030377 A1 Feb. 10, 2005

Related U.S. Application Data

(60) Provisional application No. 60/461,170, filed on Apr. 7, 2003.

(51) Int. Cl.
*H04B 1/10* (2006.01)
(52) U.S. Cl. .............. 455/278.1; 455/562.1; 455/41.2; 375/347
(58) Field of Classification Search ........ 455/522, 455/556.2, 272, 334, 41.2, 500–504, 63.4, 455/69, 67.11, 132, 562.1, 101, 303, 59, 137, 455/140, 276.1, 278.1; 375/347, 349
See application file for complete search history.

(56) References Cited

U.S. PATENT DOCUMENTS

| | | | |
|---|---|---|---|
| 4,635,063 A | 1/1987 | Chang et al. | |
| 5,028,931 A | 7/1991 | Ward | |
| 5,315,532 A | 5/1994 | Comon | |
| 5,383,164 A | 1/1995 | Sejnowski et al. | |
| 5,596,333 A | 1/1997 | Bruckert | |
| 5,949,833 A | 9/1999 | Weerackody | |
| 5,959,966 A | 9/1999 | Torkkola | |
| 5,982,327 A | 11/1999 | Vook et al. | |
| 6,018,317 A | 1/2000 | Dogan et al. | |
| 6,128,276 A | 10/2000 | Agee | |
| 6,160,839 A | 12/2000 | Zhang | |
| 6,188,913 B1 | 2/2001 | Fukagawa et al. | |
| 6,201,955 B1 | 3/2001 | Jasper et al. | |
| 6,236,862 B1 | 5/2001 | Erten et al. | |
| 6,298,082 B1 | 10/2001 | Harrison | |
| 6,314,305 B1 | 11/2001 | Solondz et al. | |

(Continued)

FOREIGN PATENT DOCUMENTS

EP 1 152 548 11/2001

(Continued)

OTHER PUBLICATIONS

TEW-AP100 11 Mbps Wireless Access Point Product Description; www.trendward.com/products/TEW-AP100.htm; Oct. 29, 2001; 4 pages.

(Continued)

*Primary Examiner*—Blane J Jackson
(74) *Attorney, Agent, or Firm*—Connolly Bove Lodge & Hutz LLP

(57) ABSTRACT

A wireless monitoring receiver and system use multiple video data feeds from a plurality of cameras. The video feeds are transmitted using a multi-antenna technique, and decoded by a a multi-antenna processor. The resulting transmissions are resistant to noise, interference, etc., and can be focused using antenna beams to achieve a simple form of location encryption.

42 Claims, 16 Drawing Sheets

U.S. PATENT DOCUMENTS

| | | | |
|---|---|---|---|
| 6,314,394 | B1 | 11/2001 | Finn |
| 6,321,200 | B1 | 11/2001 | Casey |
| 6,370,129 | B1 | 4/2002 | Huang |
| 6,404,386 | B1 | 6/2002 | Proctor, Jr. et al. |
| 6,453,177 | B1 | 9/2002 | Wong et al. |
| 6,865,545 | B1 | 12/2003 | Raleigh et al. |
| 7,126,926 | B1* | 10/2006 | Bjorklund et al. .......... 370/328 |
| 2001/0005685 | A1 | 6/2001 | Nishimori et al. |
| 2002/0101942 | A1 | 8/2002 | Lindgren et al. |
| 2003/0072382 | A1 | 4/2003 | Raleigh et al. |
| 2003/0104830 | A1* | 6/2003 | Norwood et al. ........... 455/517 |
| 2003/0162519 | A1* | 8/2003 | Smith et al. ............. 455/277.1 |
| 2003/0220112 | A1 | 11/2003 | Bugeja |
| 2004/0082356 | A1* | 4/2004 | Walton et al. .............. 455/522 |
| 2004/0087324 | A1* | 5/2004 | Ketchum et al. .......... 455/513 |
| 2004/0121753 | A1* | 6/2004 | Sugar et al. ................ 455/333 |

FOREIGN PATENT DOCUMENTS

| | | |
|---|---|---|
| WO | WO 94/29967 | 12/1994 |
| WO | WO 98/37638 | 8/1998 |
| WO | WO 98/37654 | 8/1998 |
| WO | WO 98/58450 | 12/1998 |
| WO | WO 98/59450 | 12/1998 |
| WO | WO 99/10993 | 3/1999 |
| WO | WO 99/55030 | 10/1999 |
| WO | WO 00/33526 | 6/2000 |
| WO | WO 01/65725 | 9/2001 |
| WO | WO 02/47286 | 6/2002 |
| WO | WO 02/093784 | 11/2002 |

OTHER PUBLICATIONS

Compaq WL400 11 Mbps Wireless LAN Hardware Access Point Product Description; www.compaq.com/products/wireless/wlan/wl400-specifications.html; Oct. 29, 2001; 2 pgs.

Wireless Protocols: ewd's Valhalla Series Wireless Processors; www.ewdi.com/dp.dpml?dplevel=2; Oct. 29, 2001; 2 pages.

Dimitriadis et al.; "Enhanced Cellular Network Performance with Adaptive Coverage Based on Position Location of Mobile Terminals"; white paper; 4 pgs.

Gesbert et al.; "Technologies and Performance for Non-Line-of-Sight Broadband Wireless Access Networks"; IEEE Communications Magazine; Apr. 2002; pp. 86-95.

Poon et al.; "Multiple-Antenna Channels From A Combined Physical and Networking Perspective"; white paper; 5 pages.

Bana et al.; "Space Division Multiple Access (SDMA) for Robust ad hoc Vehicle Communication Networks"; The IEEE 4th Int'l. Conference on Intelligent Transportation Systems; white paper; 6 pages.

Paulraj et al.; "Smart Antennas for Mobile Communications"; Encyclopedia for Electrical Engineering; John Wiley Pub.Co.; 2000; 15 pgs.

Olson, Steven C.; "Antenna Technologies for Wireless Solutions"; white paper/presentation; Sep. 10, 1998; 35 pages.

"A Guide to IEEE 802.11b Wireless Networking Technology"; SMART Modular Technologies, Inc. 2001; 32 pages.

Sarrigeorgidis et al., "Massively Parallel Wireless Reconfigurable Processor Architecture and Programming", white paper, 8 pages.

Maeda et al., "Blind Signal Separation Via Simultaneous Pertubation Method", white paper, 4 pages.

Rabaey, Jan M., "Silicon Architectures for Wireless Systems—Part 1", Berkeley Wireless Research Center white paper, 52 pages.

Rabaey, Jan M., "Silicon Architectures for Wireless Systems—Part 2 Configurable Processors", Berkeley Wireless Research Center white paper, 66 pages.

Rabaey, Jan M.; "Wireless Beyond the Third Generation—Facing the Energy Challenge"; Berkeley Wireless Research Center; ISLPED 2001, Huntington Beach; 38 pages.

Micronet SP900 Series RadioLink Wireless LAN Product Information Sheet; Mar. 2001; 4 pages.

Devlin, Malachy Ph.D.; "How to Make Smart Antenna Arrays"; Xcell Journal; Spring 2003, 4 pages.

"Smart Antenna Technology and Applications" Symposium Presentation, 40 pages.

Ellingson et al., "Open Loop Forward Link Beamforming with Diversity Switching", IEEE Transactions on Vehicular Technology, Apr. 30, 2001, 22 pages.

Tehrani, Ardavan Maleki, "Space-Time Coding Over a Code Division Multiple Access System", IEEE 1999, pp. 134-138.

Poon et al., "An Adaptive Multi-Antenna Transceiver for Slowly Flat Fading Channels", white paper, Mar. 13, 2002, 20 pages.

Lackpour, et al., "Architecture and Predicted Performance of an IEEE 802.11b-like WMAN Transceiver at 5.8GHz", white paper, 7 pages.

Liu, et al., "A System-Theoretic Foundation For Blind Signal Separation of Mimo-Fir Convolutive Mixtures—A Review", white paper, 7 pages.

Kelly, Ryan, A Space Division Multiple Access System—An Analysis and Prototype Proposal, ENEL 698 Final Project Report, Dec. 17, 1997, 66 pgs.

* cited by examiner

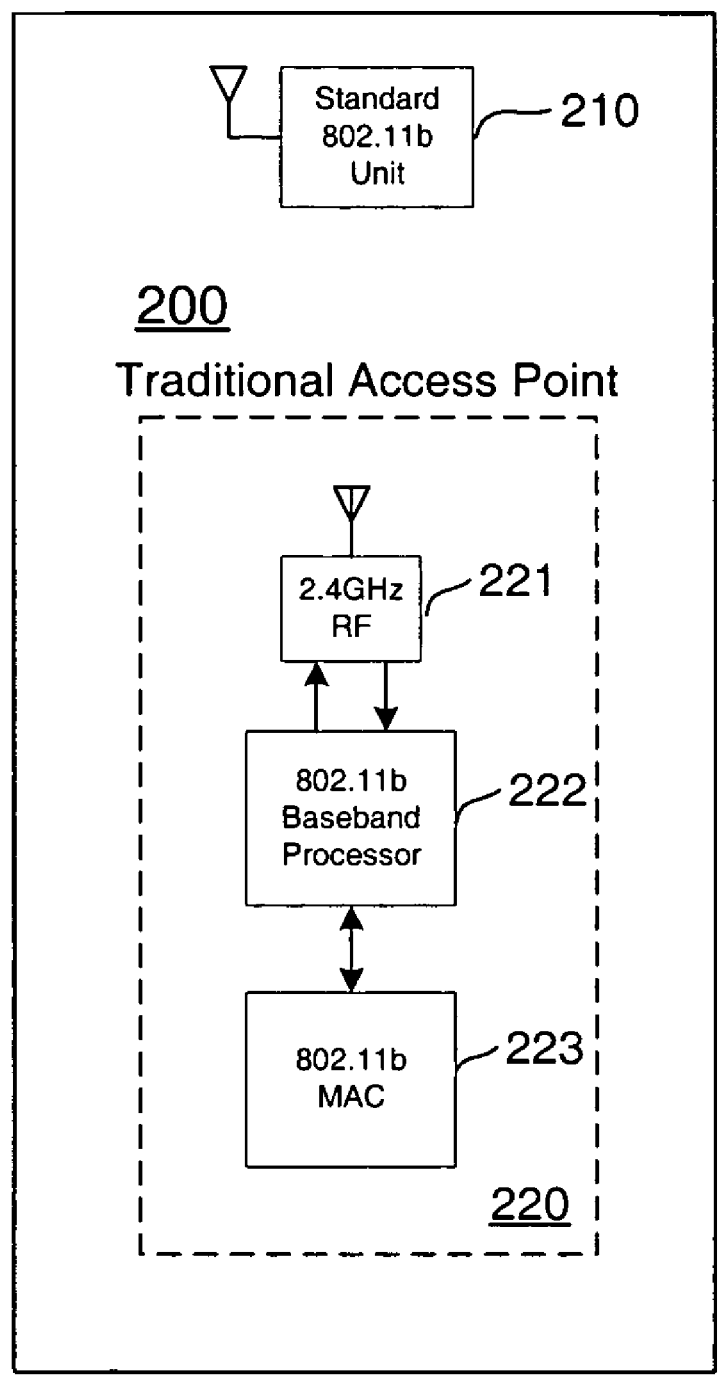

MONITORING SYSTEM USING MULTI-ANTENNA TRANSCEIVERS

CROSS REFERENCE TO RELATED APPLICATIONS

The present application claims priority to provisional application Ser. No. 60/461,170 filed Apr. 7, 2003, which is hereby incorporated by reference.

FIELD OF THE INVENTION

This invention generally relates to monitoring systems which use radio frequency (RF) access points, and in particular to systems which use multi-antenna implementations of the same.

BACKGROUND OF THE INVENTION

Internet usage is increasing dramatically across the world. Wireless connections starting with a wireless local area network (WLAN) are attractive in many environments where labor/construction costs are high. Historically, WLANs were viewed as a niche market with proprietary protocols, high costs, and unrealized performance. With the adoption of IEEE 802.11 standards, WLANs now offer a viable alternative to wired LANs, as evident with the explosive growth over the past few years. Both large and small companies have or plan to offer solutions based on IEEE 802.11b (WiFiTM), 802.11a and 802.11g. For wide spread adoption, issues in the form of security, higher speeds, and increased radius of operation will need to be addressed.

WLAN Overview

The adoption of 802.11 standards made possible increased speeds, interoperability between systems, and cost reductions that made WLAN a feasible alternative. Companies like Lucent, Intersil, Cisco, 3COM, Texas Instruments, Microsoft, and Intel have or have announced products supporting the IEEE 802.11 standards. The 802.11 standards define the physical layer (PHY) and media access control layer (MAC); since these layers are based on 802 Ethernet protocol and CSMA/CA shared media techniques, any LAN application, network operating system, or protocol (such as TCP/IP) will run on a 802.11 compliant WLAN.

The WLAN market is comprised of several technologies all competing with different techniques and performance characteristics.

HomeRF and Home Rf 2.0 (WBFH)
IEEE 802.11b DSSS)
IEEE 802.11a (OFDM)
IEEE 802.11g
HiperLAN/2
MMAC At the moment, the focus of the standard is on ether the 2.4 GHz band known as 802.11b or the 5 GHz band known as 802.11a. The supported data rates are up to 11 Mbps for 802.11b and are up to 54 Mbps for 802.11a. Products which conform to the 802.11b spec will in most cases work together and interoperate with ease. Essentially, the 802.11b or 11a standard provides open, asynchronous networking that requires a distributed control function.

Much like base stations for cellular technology, WLANs use an Access Point (AP) to provide wireless access to mobile terminals (MTs) or other devices in the network. AP is a cheap version of the base station for cellular technology and plays a very important role in WLAN. These APs are either connected to other APs, to other wired networks such as Ethernet, or connected to a broadband access medium such as DSL, cable, T1, etc.

IEEE 802.11b

The IEEE 802.11b operates in the unlicensed 2.4 GHz band. This standard permits two (2) distinctive types of transmission for data, Frequency Hopping Spread Spectrum (FHSS) and Direct Sequencing Spread Spectrum (DSSS). With the number of products and companies supporting DSSS, it has become the predominant standard for IEEE 802.11b. A raw data rate of 11 Mbps, 5.5 Mbps, 2 Mbps, or 1 Mbps is specified with a range of 100 meters.

Conventional configurations include single carrier, single receiver (Rx) and single transmitter (Tx) deploying a single omni-directional or dual dipole antenna. This is a simple and low cost solution. 802.11b is the predominant solution available on the market today. Since lower cost RF components may be used to achieve the requirements of 802.11b, the system cost has contributed to rapid growth.

Fundamental wireless channel impairments such as multipath (delay spread, temporal and frequency fading), interference, and noise greatly reduce the radius of the system. In most indoor environments, the 11 Mbps data rate is not achievable at 50 meters.

IEEE 802.11a

For higher speeds, companies are looking at IEEE 802.11a with 54 Mbps data rate. 802.11a uses a technique called Orthogonal Frequency Division Multiplexing (OFDM). OFDM sends multiple data streams simultaneously over separate radio signals in the less congested 5 GHz radio band, which has three (3) times the available spectrum. However, as the number of devices utilizing this band increases, congestion will also become an issue.

Although 802.11a offers a high data rate of 54 Mbps, a fundamental difference between 2.4 GHz and 5 GHz is the transmission range and corresponding coverage area. All things being equal, a higher frequency band will transmit a signal a shorter distance than a lower frequency band. The actual range at 54 Mbps in many instances may be less than 20 meters. This is of particular significance when considering the number of access points (APs) required for a similar area of coverage using 802.11a compared to 802.11b.

Barriers—Interference/Noise

Given the high cost of licensed spectrum, typical WLAN systems utilize either the 2.4 GHz or 5 GHz unlicensed (free) spectrum. As such, other devices and technology like microwave ovens, Bluetooth, satellite systems, and proprietary applications utilizing these unlicensed bands has created an overcrowding situation that will only get worse. A fundamental concern for all WLAN is the interference and noise between devices operating within the same spectrum.

Interference and noise may be viewed in two (2) types; in-band interference and out-of-band interference. Out-of-band interference or noise may be filtered out using the analog section of the receiver. In-band interference would include such time-varying impairments as multiple access interference and multipath conditions. Because the transmitted signal may take multiple paths in reaching the receiver, signal processing is required to address the delay spread, temporal and frequency fading.

Generally speaking, as the noise and interference increases the decipherable signal radius decreases. As a result, additional APs are required to complete coverage for a given area increasing costs and contributing to more interference.

Security

In a survey sponsored by Microsoft, security was the primary issue concerning companies implementing WLANs. The 802.11 standards address the issue in a couple of ways: Extended Service Set ID (ESSID) and Wired Equivalent Privacy (WEP). For ESSID, all mobile units associate themselves with an AP. This type of protection is limited since some products allow the mobile unit to attach to any AP, while others allow the user to browse and dynamically attach to a network.

WEP is a shared-key encryption mechanism option under 802.1 that employs either a 40-bit or 128-bit encryption using the RC4 algorithm. Unfortunately, many vendors have only just begun to implement this feature and it still relies on manual key distribution.

Multi-Antenna Technologies

Multi-beam wireless antenna systems are described in a number of references, including the following:

U.S. Publication No. 2001/0036843 to Thompson;
U.S. Pat. No. 6,351,499 to Paulraj et al.;

Furthermore, the use of multiple antennas for WLANs are also mentioned in an article entitled "Technologies and Performance for Non-Line-of Sight Broadband Wireless Access Networks" by Gesbert et al. in IEEE Communications Magazine, April 2002.

The above materials are hereby incorporated by reference.

Using multiple antennas at one or both ends of a wireless link can significantly increase a bit rate. By using multiple antennas at both the transmitter and the receiver, a matrix channel is created in which transmitting occurs over several independent spatial "dimensions" or "modes" within the same time frequency slot at no additional power expenditure.

In the art, this technique is referred to as spatial multiplexing (SM). As Gesbert et al. explain, a data rate can be scaled in accordance with a number of antennas employed. In operation, a high-data rate signal to be transmitted is first multiplexed into multiple bitstreams. These bitstreams are then transmitted simultaneously using multiple antennas. This causes the independent signals to be mixed in the channel since they occupy the same time and frequency resource.

At the receiver, the multiple received signals are separated, and individual data streams are demultiplexed to yield the original high rate signal. The separation is made possible by the fact that each transmit/receive antenna effectively sees a very different channel because of extensive multipath effects.

While such references generally describe the utility of multi-beam signal processing, they do fail to describe embodiments which would be compatible with conventional 802.11x based protocols (i.e, 802.11a, 802.11b, 802.11g, etc.) to enhance a conventional operating range of access points systems, and/or which could be efficiently implemented in integrated circuit solutions.

There is also a strong need for wireless systems which can handle situations in which the separation of incoming signals is very small, such as occurs in typical office space environments.

Furthermore, wireless security remains a significant problem. Any additional measures which can be used to "encrypt" a data transmission are extremely valuable in wireless applications.

SUMMARY OF THE INVENTION

An object of the present invention, therefore, is to provide a system and method which overcomes or ameliorates the drawbacks of the aforementioned systems.

Accordingly, a first aspect of the invention concerns a radio frequency (RF) multi-antenna access point enhancement circuit. The circuit includes a multi-antenna signal processing circuit situated in a first access point and adapted to (a) operate simultaneously with a first baseband processor, so that the first baseband processor handles data transmissions in a first mode between the first access point and a second access point under a first channel transmission condition, and the multi-antenna signal processor handles data transmissions in a second mode between the first access point and the second access point under a second channel transmission condition; (b) receive M independent RF modulated input signals from the second access point when the second channel transmission mode exists between the first access point and the second access point; and (c) process the M independent RF modulated input signals using a channel mixing matrix to extract N independent data signals transmitted by the second access point.

Thus, the multi-antenna signal processing circuit operates selectively with a first baseband processor to demodulate RF signals received in a channel from a second access point. The enabling conditions can include, for example, when channel conditions indicate that a data rate in the channel has fallen below a predetermined threshold; or based on a determination that a data rate in the channel is to be enhanced above a nominal operating rate; and/or that frequency selective fading is present in the channel.

In certain preferred embodiments, the multi-antenna signal processing circuit is situated in a signal path ahead of the first baseband processor, and is further adapted to monitor channel transmission conditions. Preferably, too, the system is compatible with an 802.11x communications protocol.

Another aspect of the invention concerns a single CMOS chip implementation of the aforementioned multi-antenna AP. This is possible because a total gate count of the present architecture is sufficiently small.

A further aspect of the invention concerns a latency masking circuit. This circuit is used in certain embodiments to maintain timing compatibility with protocols which include strict response time requirements. In this fashion, processing latency of the multi-antenna signal processing circuit is compensated/masked using a speculative data response.

Still another aspect of the invention concerns a method of operating a radio frequency (RF) signal processing circuit as noted above and associated multi-antenna processor.

Another aspect of the invention includes a closed circuit broadcast security system based on the aforementioned multi-antenna transmitter/receiver.

It will be understood by those skilled in the are that the present invention will be useful in a number of environments, including wireless local area networks (WLAN), Broadband wireless cable (such as MMDS—Metropolitan Multipoint Distribution Service network at 2.5-GHz and 5-GHz; and LMDS—Local Multipoint Distribution Service networks at 28-GHz), Direct Satellite Broadcast, 3G (Third Generation) Mobile Systems, and Digital audio or video broadcast.

BRIEF DESCRIPTION OF THE DRAWINGS

FIG. 2 is a block diagram depicting a typical prior art wireless access point system;

DETAILED DESCRIPTION OF THE INVENTION

General Overview

As alluded to above, generally speaking, as the noise and interference in a wireless medium increases, the decipherable signal radius decreases. As a result, additional access points (APs) are required to complete coverage for a given area increasing costs and contributing to more interference. The present invention uses a multi-antenna approach that reduces those effects of multipath, interference, and noise through a technique generally referred to in the art as adaptive signal separation processing.

As further noted above, security, increased areas of operation (radius) and higher speeds are three (3) of the main barriers facing WLANs. The present invention makes use of adaptive signal separate processing to enhance the performance of WLAN 802.11b network APs. The enhancement is referred to herein as 11b$^e$, and is intended to be used in the WLAN 802.11b AP with multiple antennas, RF receivers and transmitters. The present 11b$^e$ technique serves as a scalable signal processing engine for all functions of radius and speed enhancement in the WLAN 802.11b physical layer. The hardware and software changes for the enhancement are only limited to APs. In other words, mobile terminals can be standard 802.11b devices. While the present preferred embodiment is directed to an 802.11b application, it will be apparent to those skilled in the art that with limited modifications the invention can be also applied to WLAN 802.11a, WLAN 802.11g, Wireless WAN 802.16 and any number of similar wireless environments.

In an 802.11 environment, the present invention implements digital signal processing functions to enhance a single 802.11b connection over a 2.4 GHz RF link. It can be understood as a Multi Inputs Multi Outputs (MIMO) system or Single Input Multi Outputs (SIMO) system.

Figure 6A:
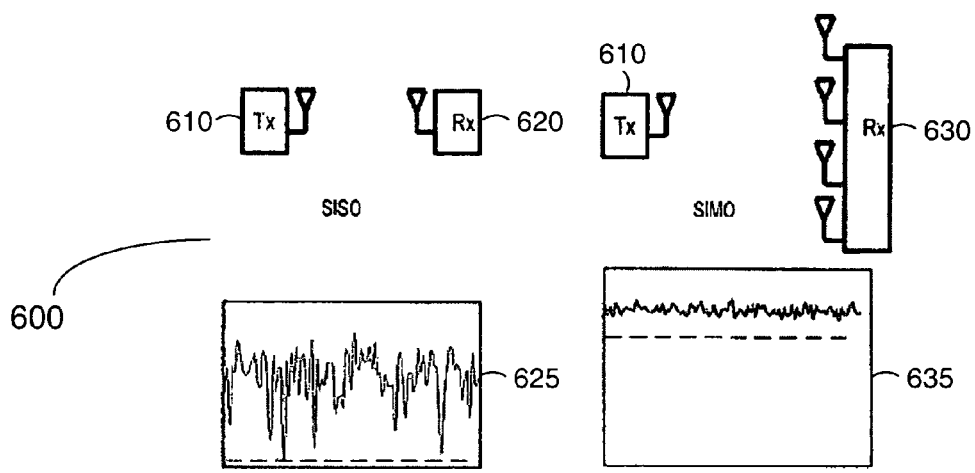
FIG. 6A is a pictorial depiction of relative performance characteristics, including receiver sensitivity, between the prior art and certain preferred embodiments of the present invention.

FIG. 6A compares a typical RF reception signal shown as SISO (Single Input Single Output) used in the prior art to that of the enhanced SIMO AP of the present invention. A prior art single antenna transmitter 610 communicates to a single antenna receiver 620. The resulting received signal level and sensitivity are shown by reference number 625. In contrast the multi-antenna receiver 630 receiving a transmission is able to differentiate four separate signals, improving the overall receiving signal level and sensitivity as shown at 635. In other words, the curves under these reception methods are the received signal levels and the dashed lines are the would-be designed sensitivity level of the receivers. We can see the reception is greatly improved by the multi-antenna AP.

Figure 1:
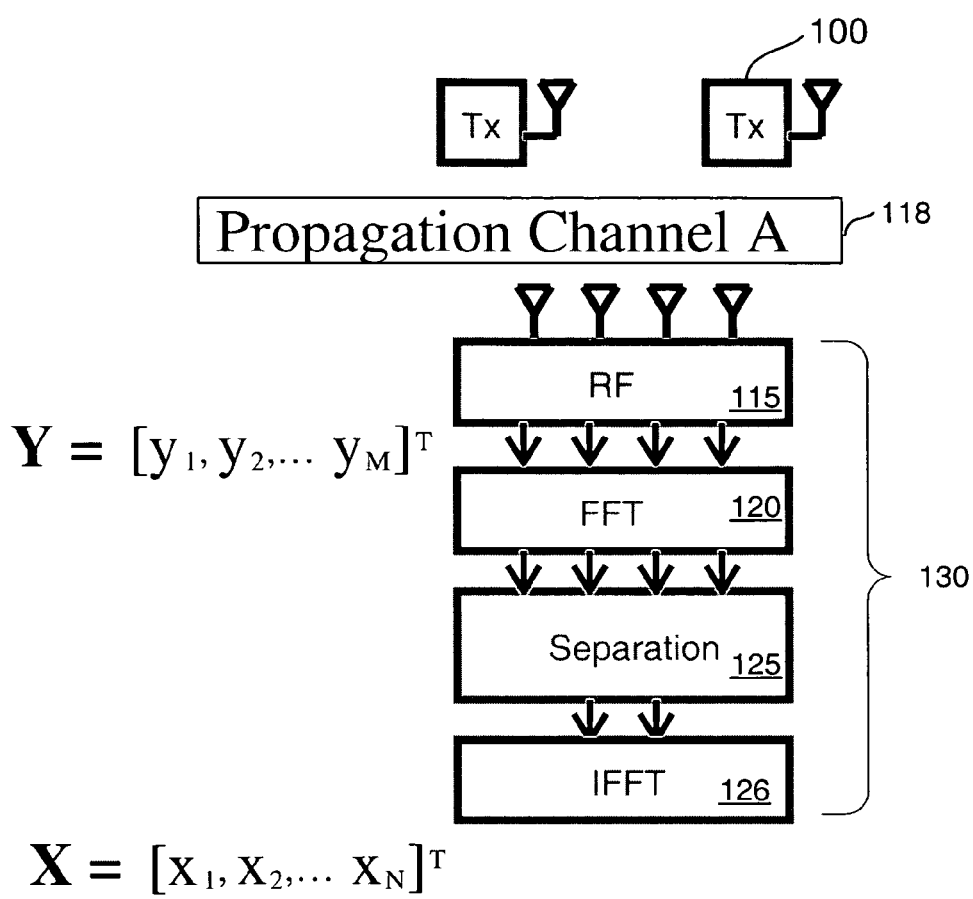
FIG. 1 is a diagram illustrating the principles of signal spatial separation employed in embodiments of the present invention.

The theory of operation of the present invention is illustrated basically in FIG. 1. A set of transmitters 100 communicate through a propagation channel 110 to a multi-antenna receiver 130. The multi-antenna receiver 130 includes a number of processing stages, including generally an RF circuit 115, a Fast Fourier Transform circuit 120, a Separation circuit 125, and an Inverse Fast Fourier Transform circuit 126. It will be apparent to those skilled in the art that these circuits will typically be implemented in either hardware form, or some combination of processor and software. A typical separation circuit is described in U.S. application Ser. No. 10/374,905 filed Feb. 22, 2003 which is hereby incorporated by reference; other embodiments may be preferable for other environments.

As seen further in FIG. 1, the signal processing may be seen to be as follows:

$$Y = AX + N \quad (1.0)$$

where $X = [x_1(t), x_2(t), \ldots x_N(t)]^T$ is N signals to be transmitted; $Y = [y_1(t), y_2(t), \ldots y_M(t)]^T$ is M received signals from RF; A is an M by N propagation medium mixing matrix; $N = [n_1(t), n_2(t), \ldots n_M(t)]^T$ is M additive white noises from M receivers. In the time domain, Eq. 1.0 can be considered when there are either short or non-existent multi-path delays. When short multi-path delay conditions cannot be met, AX in (1.0) can be considered either as a convolution operation or as a frequency domain. Since convolution operations are usually complicated, is it preferable to concentrate effort in the frequency domain cases.

The least squares solution to (1.0) is:

$$X=(A^*A)^{-1}A^*Y \quad (1.1)$$

Where the channel mixing matrix A can be either blindly estimated, as what was done in the analog implementation using HJ networks with Bartley matrix, or in accordance with the teachings of Ser. No. 10/374,905, or as characterized by using a training signal which is a preamble of a Physical Layer Convergence Protocol (PLCP) in 820.11b.

Further details of the structure and operation of the multi-antenna wireless access point system of the present invention are described below.

Performance Benefits of the Present Invention

The performance enhancement of a multi-antenna (SIMO) Access Point (AP) is beneficial from two aspects:

Increased Operating Range

The transmitted and received power is M times larger than a traditional single transmitter-single receiver (SISO) AP. For noise from multipath delays, the enhancement provides a very good way of equalization. The signals after equalization are at least M times strong than a single receiver system. If M=4, the increase in received power translates to a 2× increase in range, as shown in Eq. 1.2.

$$P=M^*p_0^*(2^*r)^{-2}=p_0^*r^{-2} \quad (1.2)$$

Where P is the power received by M=4 receivers, $p_0$ is the power received at a unit distance from a radiator. This results in an increased coverage radius.

Thus in contrast to the traditional AP or multi-antenna AP that receives the signal on the best single antenna, the multi-antenna AP described here optimally combines all energy available from the antenna, equalizes them, and provides the best demodulation possible to decode the signals. This multi-antenna AP has several advantages over the traditional AP, including increased operating radius. This is shown generally in FIG. 6D.

It can be seen that this increased operating range allows mobile terminals (MTs) a greater option in connecting to APs, because a particular terminal can now communicate with APs in a larger area. This in turn means that it is possible to connect on a selected basis to APs which are experiencing less traffic, noise, etc., on a transmission by transmission basis.

Reduced Selective Frequency Fading

When the multipath delays are long enough, the multipath effect can produce a frequency selective fading. The frequency selective fading effect means that the received signal S(t) at frequency $f_1$ - - - $s_1(t)$ is much weaker than the received signal S(t) at frequency $f_2$ - - - $s_2(t)$. The effect can be illustrated as following:

$$s_1(t)=e^{-i2\pi f_1 t}+e^{-i2\pi f_1(t+\Delta t)}=e^{-i2\pi f_1 t}(1+e^{-i2\pi f_1 \Delta t}) \quad (1.3a)$$

$$s_2(t)=e^{-i2\pi f_2 t}+e^{-i2\pi f_2(t+\Delta t)}=e^{-i2\pi f_2 t}(1+e^{-i2\pi f_2 \Delta t}) \quad (1.3b)$$

where S(t) is the resulting signal from a combination of the two paths, $s_1(t)$ and $s_2(t)$, which are the frequency components of the signal S(t) at frequency $f_1$, frequency $f_2$, respectively. In (1.3a) and (1.3b), the two paths are assumed to have the same amplitude but with a delay difference $\Delta t$. To see the frequency selective fading effect, one can let $s_1(t)=0$ and $s_2(t)=2e^{-i2\pi f_2 t}$, which translates (1.3a) and (1.3b) to:

$$(1+e^{-i2\pi f_1 \Delta t})=0 \quad (1.3c)$$

$$(1+e^{-i2\pi f_2 \Delta t})=2 \quad (1.3e)$$

For the smallest possible $\Delta t$ to produce the effect, $s_1(t)=0$ and $s_2(t)=2e^{-i2\pi f_2 t}$.

$$f_1\Delta t=\frac{1}{2} \quad (1.3e)$$

$$f_2\Delta t=1 \quad (1.3f)$$

Therefore $$(f_2-f_1)=1/(2\Delta t) \quad (1.3g).$$

For 802.11b systems, the bandwidth is 22 MHz. If $f_2$ and $f_1$ are two frequency points in that band, one can see for $f_2-f_1=11$ MHz, $\Delta t=46$ ns. This means that delay is as small as 46 ns, whereby certain conditions can produce a severe frequency selective fading. The delay difference of 46 ns can be translated to a path difference of 14 meters, which can be easily seen in SOHO environments. When the wireless device bandwidth continues to increase for the non-802.11 applications, the path difference would further decrease and making it easier to see.

When frequency selective fading happens, the performance of the multi-antenna AP of the present invention is much better than that of the traditional single transmitter-single receiver AP. The traditional AP handles frequency selective fading with an equalizer. However, as shown in (1.3c), the signal component $s_1(t)$ at frequency $f_1$ is zero and, therefore, there would be a lack of a signal to equalize with. The traditional AP has only two options: either switch to a lower data rate mode, and thereby use the processing gains to compensate the frequency null, or switch to another antenna. The trade off of the $1^{st}$ option is a slower data rate. The later option does not guarantee the absence of the frequency selective fading at the different frequency $f_i$ for the other antenna. At the same time the traditional AP does not take the advantage of the fact that we have better reception at frequency $f_2$. The multi-antenna AP can use (1.1) to automatically compensate any frequency null in the information from the other antenna, and provides an optimum solution for the reception when the frequency selective fading happens.

Increased High Data Rate Covering Radius

Figure 6B:
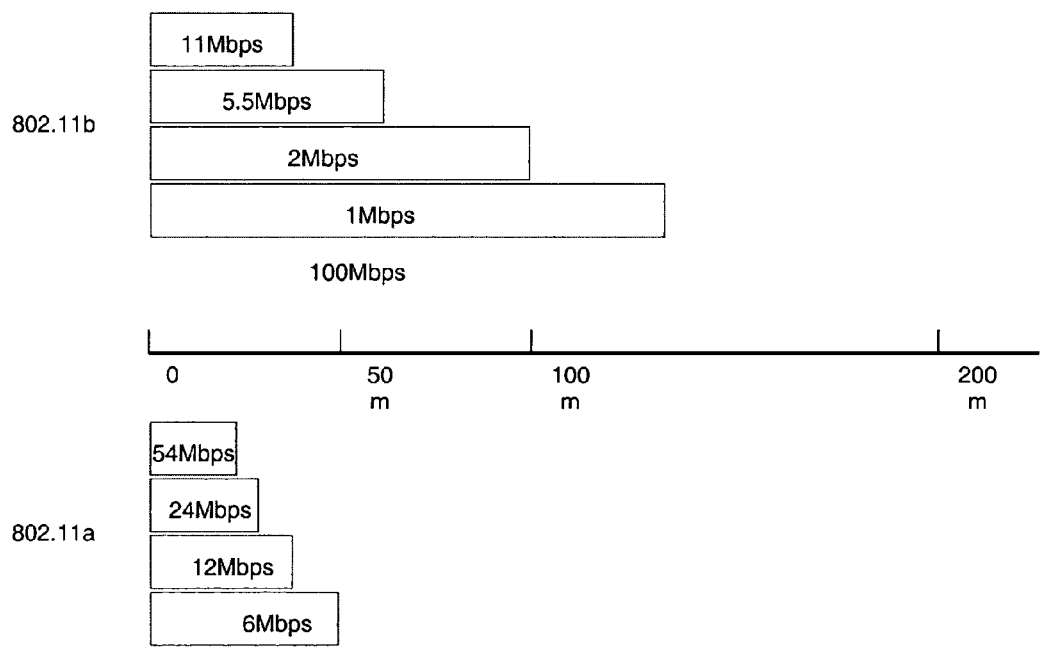
FIG. 6B is a graphical depiction of a prior art data rate achievable with conventional prior art 802.11x based systems.

The projected though-put of an 802.11b and 802.11a system under various propagation conditions is shown in FIG. 6B. The bars represent the typical range and data rate of an 802.11b and 802.11a system under such conditions. The performance of 802.11b WLAN AP can be greatly improved through multi-antenna reception as shown by the additional shaded areas in FIG. 6C. The 802.11b WLAN Access Point enhancement of the present invention can dramatically increase the performance of an 802.11b system, and similar wireless transmission systems.

Increased Security

Figure 6C:
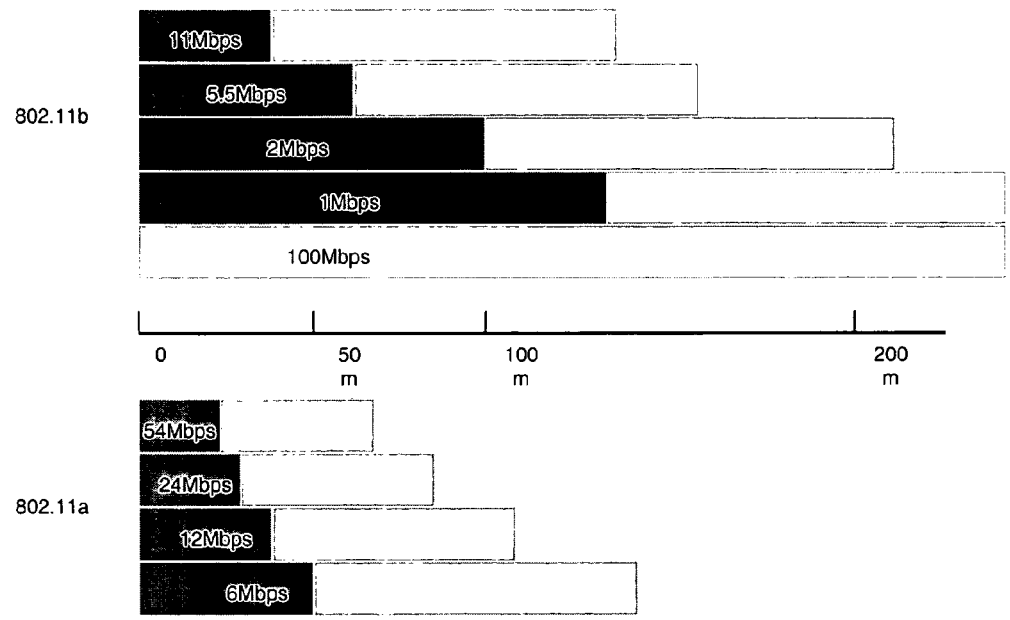
FIG. 6C is a graphical depiction of a data rate achievable with wireless access point implemented in accordance with the present teachings.
Figure 6D:
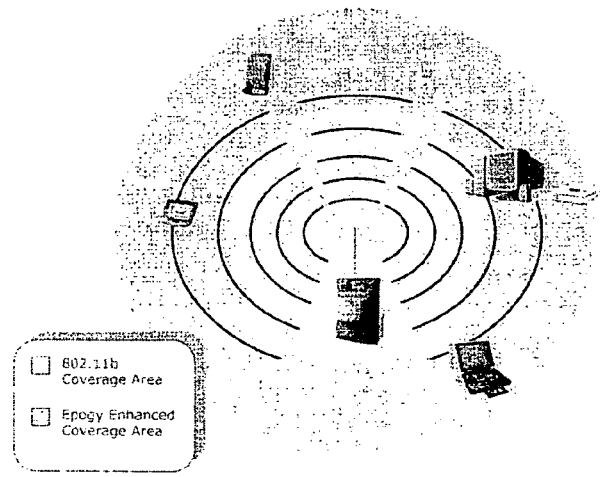
FIG. 6D is a pictorial depiction of relative performance characteristics, including transceiver area coverage, between the prior art and certain preferred embodiments of the present invention.
Figure 6E:
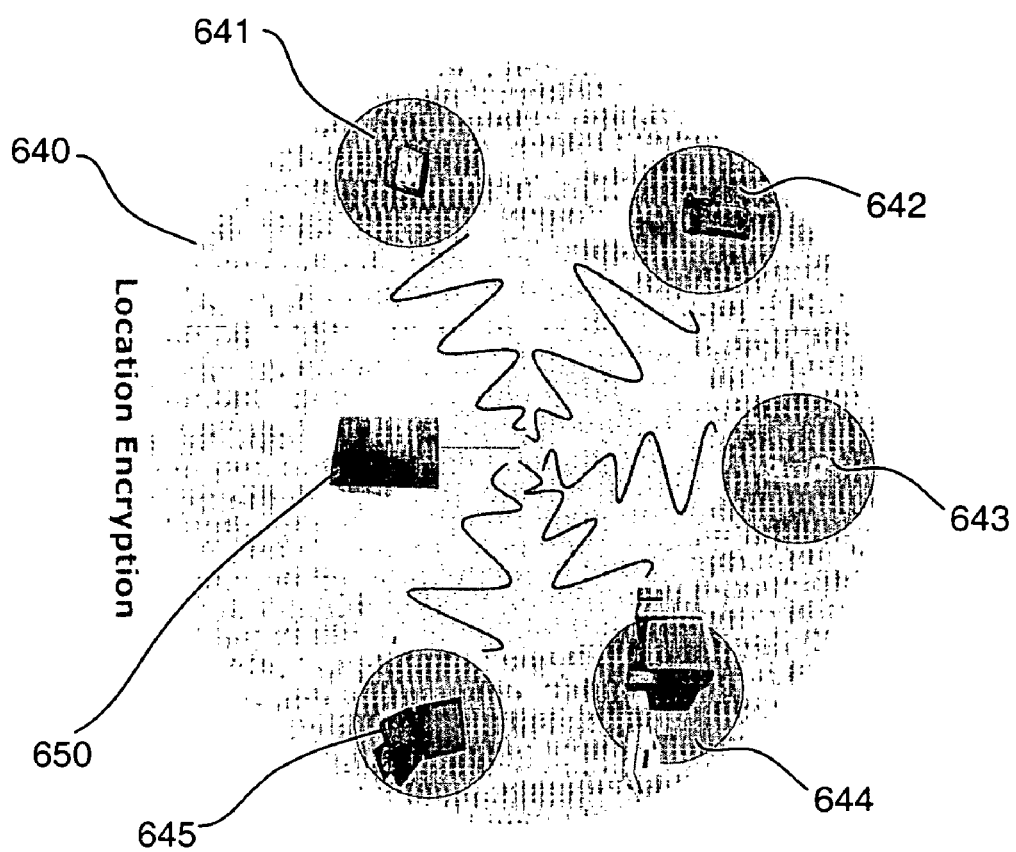
FIG. 6E is a pictorial graphical depiction of a location encryption capability implemented in accordance with the present teachings.

As seen in FIG. 6E, in preferred embodiments of the present invention the emission RF energy from an AP 650 within an available coverage area 640 is not distributed uniformly. Instead, it is concentrated primarily at positions of intended mobile terminals (MTs) and other devices 641-645, and is significantly less everywhere else. This dramatically decreases the possibility of intercepted by other unwanted intruders.

The RF energy of the transmitted signal in the present inventions may be reduced to noise for 95% of the remaining coverage area. This is done by modulating energy of the individual antennas, frequencies, etc. Interception would require a device to be positioned similar to the MT, which is unlikely to go undetected by the intended user of the AP; otherwise, the intercepted signal in other areas would be undecipherable from noise. Furthermore, since the location of MTs is typically changing in time, this means that the concentration of the transmitted energy is also changing in time, further reducing the opportunity for unauthorized useage in a particular region.

This energy modulation security scheme will increase any network's security. To provide further security, the transmitted data may be encrypted. In certain embodiments an encryption scheme can utilize an ever-changing key. When used in combination, a total security scheme may be achieved for the transmitted data, with a combination of location encryption and traditional key based encryption.

Longer MT Battery Life

From FIG. 6A, those skilled in the art will appreciate that the multi-antenna AP of the present invention will experience significantly less fluctuation of received power as a MT (mobile terminal) moves away from the AP. This in turn would consume less radiated power for the MT to communicate with AP. This translates to a longer battery life and less interference to adjacent AP cells.

Increased Accountability of Bandwidth Useage

Another common problem in wireless networks is unauthorized use of communications bandwidth. By tailoring a communication path to transmit energy only to specific authorized physical locations, the present invention affords better opportunities for managing available communications bandwidth and to reduce unauthorized bandwidth useage.

Structure of Present Invention

As noted above, FIG. 2 is a block diagram depicting a typical prior art wireless access point system 200. A standard 802.11b transmitter 210 communicates using a single antenna to a traditional access point 220. The latter includes an antenna/analog front end circuit 221, a baseband processor 222, and a media access controller. Again, in popular commercial environments these components are adapted to implement an 802.11x based protocol.

Figure 3A:
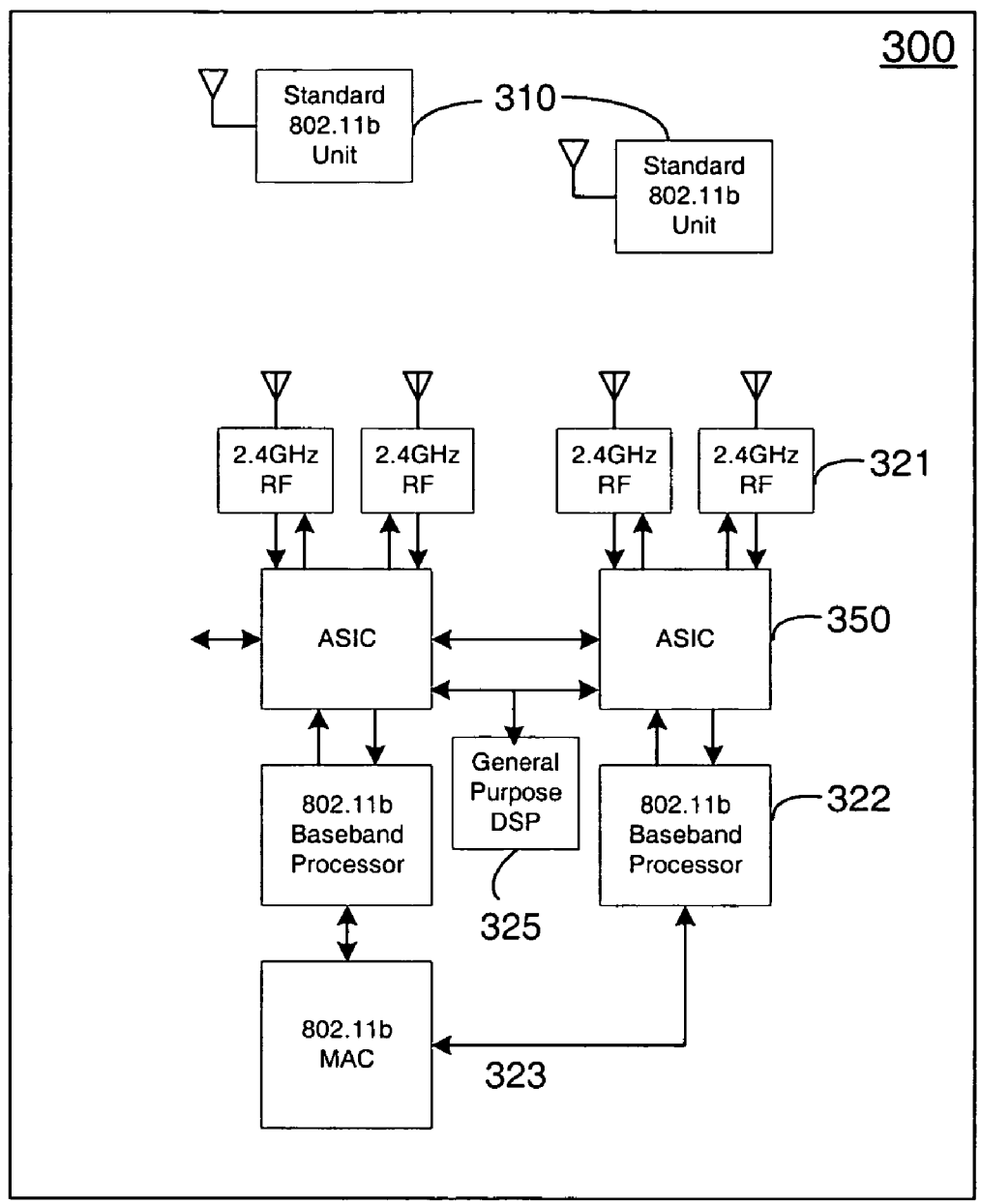
FIG. 3A is a block diagram of a preferred embodiment of a wireless access point system implemented in accordance with the present teachings.

FIG. 3A is a block diagram of a preferred embodiment of a wireless access point system 300 implemented in accordance with the present teachings. As can be seen, the most noticeable difference to the prior art is that a multi-antenna processor, implemented in the form of an application specific integrated circuit (ASIC) 350, is used to enhance a performance of such access point. Except where otherwise noted, like numerals in FIG. 3 are intended to correspond substantially to counterparts already identified in FIG. 2. Thus, the access point system 300 communicates with a number of 802.11x compatible devices 310, and includes one or more antenna/analog front end circuits 321, baseband processors 322, and a media access controller 323.

A general purpose DSP 325 may also be used in more powerful access point systems to coordinate operations among several transceivers. It will be seen that the architecture of the invention is flexible should an AP 300 require a higher receiving sensitivity. The number of multi-antenna transceivers can be configured as 2, 4, 6, and so on. The more stages added, the more powerful the AP's performance will be.

It will be further apparent to those skilled in the art that the present diagram is simplified, and omits many common elements of wireless access point systems for the purpose of better illustrating the teachings of the present disclosure.

Figure 3B:
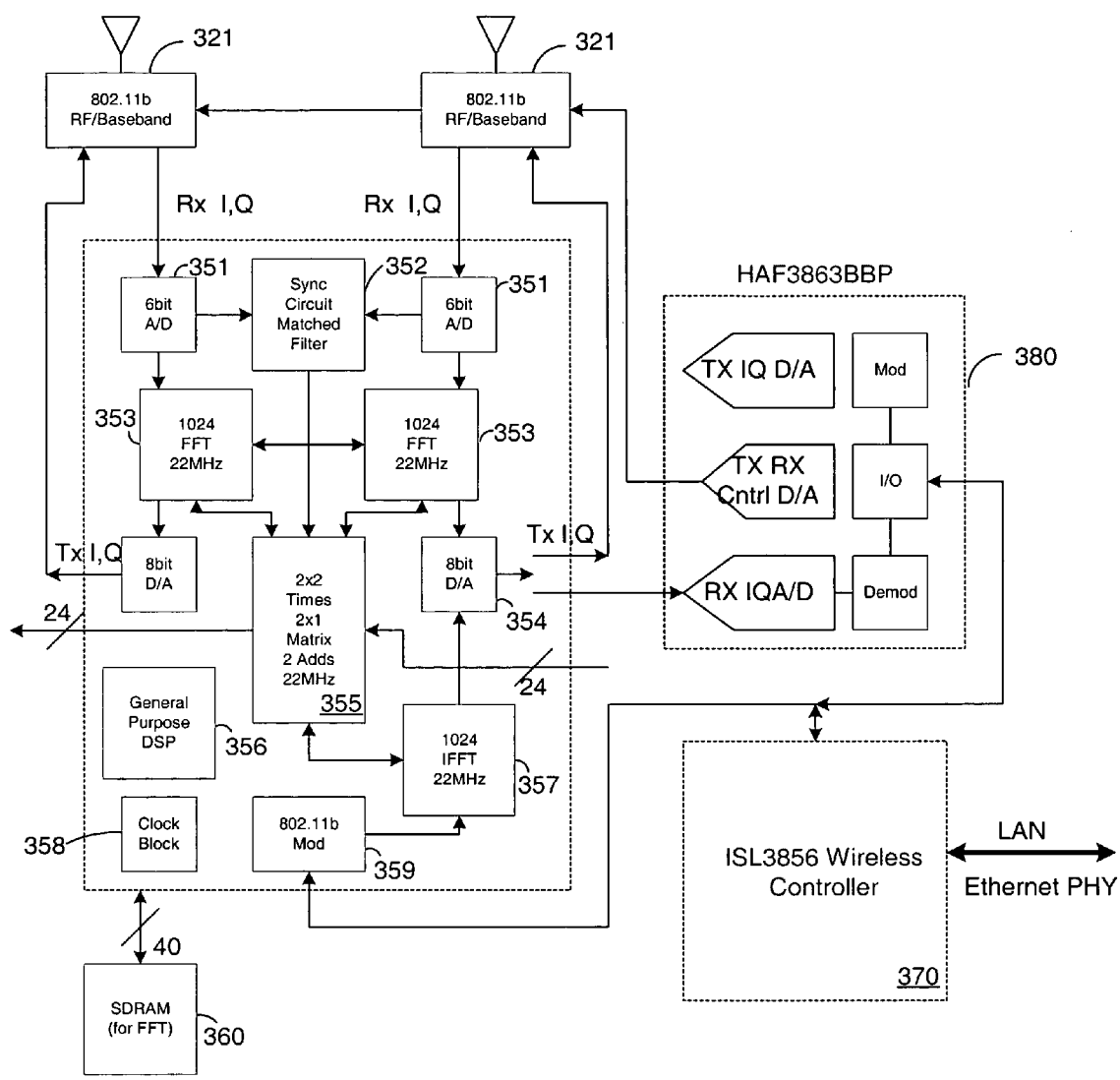
FIG. 3B is a more detailed block diagram of the preferred embodiment of FIG. 3A.

FIG. 3B is a more detailed block diagram of the preferred embodiment of FIG. 3A. In a preferred embodiment, several of the components shown therein, including multi-antenna signal processor 350, media access controller (wireless controller) 370 and baseband processor 380, are incorporated as part of a single chip integrated circuit.

Further in a preferred embodiment, ASIC 350 includes generally the following components:

Clock Generator 358
SDRAM Buffer Interface Address Generator (performed by DSP 356)
Three 1024-point FFT/IFFT switch able blocks (353, 357)
Separation Matrix Multiplier (355)
On Chip Parameter Memory Bank (411 (FIG. 4A))
Inter-chip Data Exchange Interface (359)
DSP Interface (not explicitly shown)
Preamble Acquisition Module (352)
Four 6bit A/D at 22 MHz (351)
Four 8bit D/A at 44 MHz (354)

These components basically perform the following operations:

General

A micro-controller interface (block 359) for permitting software access to internal registers as well as reading/writing of signaling messages;

A clock generator (block 358) for generating a set of clocks for all internal modules from a 44 MHz master clock;

Receive Mode

A set of A/D converters (block 351) for perfoming A/D conversion for received I and Q baseband signals from RF/Baseband front end circuits 321;

A preamble acquisition circuit (Sync Circuit 352) for acquiring the timing of the received signal samples relative to a local PN code in a PLCP preamble, synchronizing the signal samples to FFT frame, and using the known FFT of a preamble to estimate RF channels;

A FFT circuit (block 353) for transforming the received signal samples of multiple RF to the frequency domain using FFT;

A separation matrix multiplier (block 355) for separating the signals in accordance with Eq. 1.1 above;

An IFFT circuit (block 357) for reconstructing the received signal in the time domain;

A D/A converter (block 354) for converting the recovered signal to an analog form and sending it out to a standard 802.11b DSSS receiver for decoding.

Transmit Mode

A general purpose DSP 356, which, in combination with SDRAM 360 and D/A blocks 354 and other elements of ASIC 350 performs the following basic operations:

Framing of the information bit stream to be transmitted;
Symbol mapping/encoding of the bits in a transmit frame;
Scrambling the transmitted data to be transmitted;
Modulating transmission symbols with Baker or CCK codes necessary for spreading the spectrum of the transmitted data;
Pre-equalizing the generated waveforms in a frequency domain;
D/A conversion A more detailed explanation of the structure and function of the elements of multi-antenna processor 350 now follows.

Clock Generator 358 provides all necessary clocks and control signals for other modules of multi-antenna processor 350. Clock generator 358 also provides FFT/IFFT modules for the system clock of FFT operation. The system clock cycles for each FFT frame are calculated as the following:

number of passes=ceiling[($\log_2$ points)/2]=5 number of clock cycles per pass=14+points+ceiling [$\log_2$(twiddlewidth)]=14+1024+4=1042 number of clock cycles per frame=number of passes*number of clock cycles per pass=5210

The minimum clock speed for the FFT/IFFT module with 18% safety margin is:

Clock Rate=5210/1024*22 MHz*118%=132 MHz

The clock rate 132 MHz is 3 multiple of the basic clock rate 44 MHz. The clock rate 132 MHz is generated by using PLL to locked on the system clock 44 MHz. The interactions and coordination between the FFT Input SDRAM Buffer and FFT modules is done through a third sub-module, the Arbiter (not shown explicitly) in a manner well-known in the art.

The FFT start frame timing control signal is provided by Preamble Acquisition Module 352. This signal indicates the start data position pointer in an FFT Input SDRAM Buffer (not shown).

Clock generator 358 also provides Separation Multiplier Start Timing Control.

A general purpose DSP 356 or a configurable interface logic can be used to implement a SDRAM Buffer Interface Address Generator.

There are three 1024-point FFT blocks 353 and 357 operating at 130 MHz system clock. These blocks can be switched between FFT and IFFT. The input real and imaginary data are 8 bit.

The Separation Matrix Multiplier 355 essentially performs the following operation at 22 MHz when is in receiving mode:

$$x = b_1 * y_1 + b_2 * y_2 + x_n$$

where $b_1$ and $b_2$ are calculated equalization coefficients; $x_o$ is the adjacent ASIC recovered signal; $y_1$ and $Y_2$ are two received data from the current ASIC two baseband channels; x is the recovered signal. All of them are complex numbers. The operations are 2 complex multiplications and 2 complex additions. The resolution of $b_1$, $b_2$, $x_0$, $y_1$, $y_2$, x are 12 bits.

This module perform the following operation at 22 MHz when is in transmitting mode $$T_1 = b_1 * x_1, \quad T_2 = b_2 * x_1,$$

where $b_1$ and $b_2$ are calculated pre-equalization coefficients; $x_t$ is the to-be transmitted signal; $T_1$ and $T_2$ are two baseband signals to responding antenna.

Figure 4A:
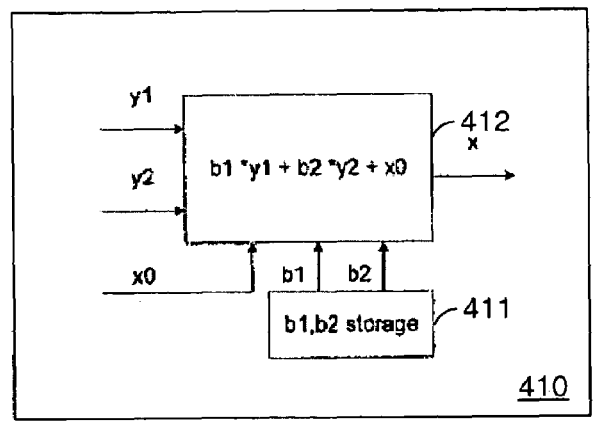
FIG. 4A is a block diagram of a multi-signal Separation Matrix Multiplier employed in various embodiments of the present invention.

A more detailed block diagram of a preferred Separation Matrix Multiplier 355 is shown in FIG. 4A, including the computation module 412 and On Chip Parameter Memory Bank 411. Coefficients $b_1$, $b_2$ are estimated channel equalization parameters for a particular 802.11b station. The on-chip parameter memory bank holds 2*1024 complex parameters for each 802.11b station. If there are 10 such stations to handle, the size of memory bank is 2*2*1024*12*10=491520 bits. The on-chip parameter memory bank is preferably SRAM but may be implemented with other types of memories.

An Inter-chip Data Exchange Interface (not shown) is designed to transfer the data $y_0$ from an adjacent multi-antenna processor ASIC (FIG. 3A) and to transfer $y_0$ to a second adjacent multi-antenna processor ASIC.

The Preamble Acquisition Module (Sync Circuit) 352 performs the initial preamble PN code timing acquisition in the receiver. The processing in this block is based on performing a set of matched filtering operations. This approach is adopted primarily to provide a fast acquisition mechanism.

Figure 4B:
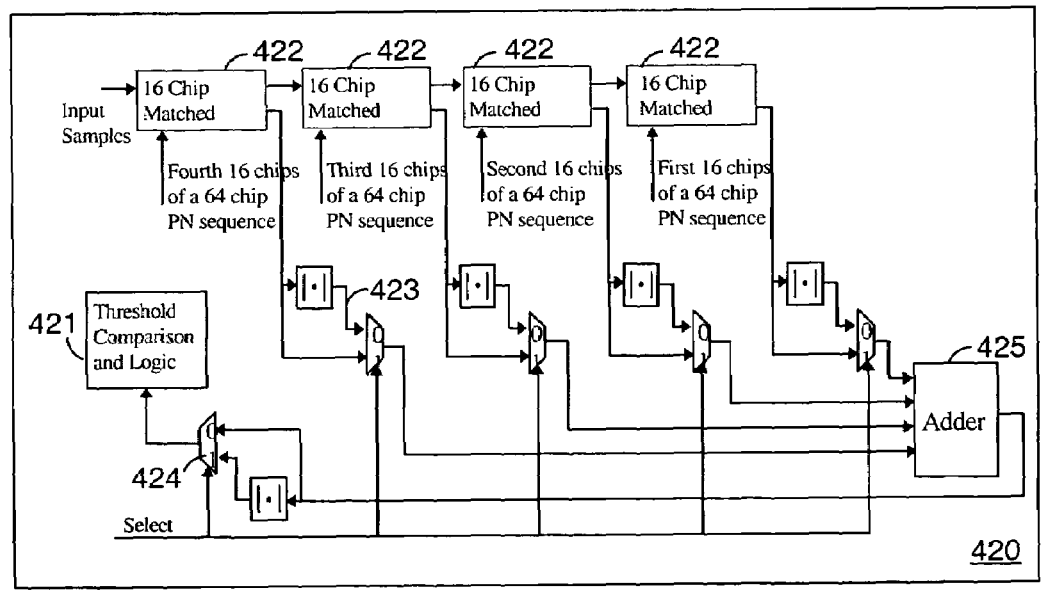
FIG. 4B is a block diagram of a Preamble Acquisition Module employed in various embodiments of the present invention.

The Preamble Acquisition Module 352 is shown in more detail in FIG. 4B. A matched filtering operation is performed by four 16 chip matched filters 422, providing a filter that is matched to any 64 chip complex sequence in cooperation with adder 425, circuit 423 and threshold comparison logic 421. The input to the matched filter is the stream of received samples at twice the chip rate. Thus, the timing accuracy provided by the Acquisition block is of the order of ¼ of a chip duration.

There are four 6 bit 22 MHz A/D in the preferred embodiment, shown as block 351. Each baseband signal needs 2 A/Ds (I and Q) to convert it to digital signals.

There are four here are four 8 bit 44 MHz D/A in the preferred embodiment shown as block 354. Each RF path needs 2 D/As (I and Q) to transmit signal to the modulator.

To estimate the DC value of the signal plus interference the received I/Q samples are subject to a low pass filter over the entire received frame. The resulting filter output is then subtracted from the I/Q samples. The low-pass filter is a single pole IIR filter of the type:

$$y_k = (1-\alpha)y_{k-1} + \alpha x_k$$

where k is the sample index.

Figure 4C:
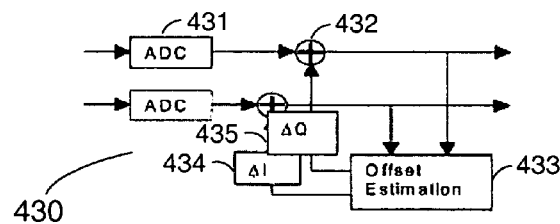
FIG. 4C is a block diagram of a DC Offset Correction Circuit employed in various embodiments of the present invention.

As seen in FIG. 4C, an offset estimation circuit 433 provides estimated offset values in the I and Q paths 434, 435 respectively which are fed back to the ADC outputs to cancel out the offsets from the analog portion of the system. This will be accomplished via a pair of adders immediately following the ADCs 430, 431, as shown in FIG. 4C.

The offset values are represented by 5 bit words. This allows correction of offsets of less than 7% of the full amplitude swing in the received signal.

Because of the efficient architecture of the present invention, it can be easily implemented in a single CMOS integrated circuit chip. The approximate gate count of the various critical components is as follows:

50 k for each FFT block (353, 357), or about 150 k total;
40 k for Preamble Acquisition Module 352
30 k for Separation Matrix Multiplier 355

A small DSP core 356 and the remaining elements require less than 50 k gates.

A typical baseband processor requires about 180 k gates for an 802.11b implementation. Since this usually involves some overlap (on the synchronization side) in functionality with the multi-antenna processor 350, it is expected that a final CMOS implementation could be rendered in as few as 400-450 k gates. This is more than achievable using conventional state of the art transistor geometries and semiconductor processing techniques.

Brief Discussion of 802.11b DSSS Specification

As additional background, the next section briefly overviews Direct Sequence Spread Spectrum (DSSS) physical layer so that it the relevance of other operational features of the invention will be apparent. The High Rate extension of the PHY for the Direct Sequence Spread Spectrum (DSSS) system known as the High Rate PHY for the 2.4 GHz band designated for ISM applications. 802.11b DSSS system builds on the data rate capabilities, as described in IEEE Std 802.11, 1999 Edition, to provide 5.5 Mbit/s and 11 Mbit/s payload data rates in addition to the 1 Mbps and 2 Mbps rates.

To provide the higher rates, 8-chip complementary code keying (CCK) is employed as the modulation scheme. The chipping rate is 11 MHz, which is the same as the DSSS system described in IEEE Std 802.11, 1999 Edition, thus providing the same occupied channel bandwidth. The basic new capability of High Rate Direct Sequence Spread Spectrum (HR/DSSS) uses the same PLCP preamble and header as the DSSS PHY, so both PHYs can co-exist in the same BSS and can use the rate switching mechanism as provided.

In addition to providing higher speed extensions to the DSSS system, a number of optional features allow the performance of a radio frequency LAN system to be improved as technology allows the implementation of these options to become cost effective. An optional mode replacing the CCK modulation with packet binary convolutional coding (HR/DSSS/PBCC) is provided. The key parameters of this interface, most relevant to, are listed in the Table below:

| Parameter | Specification |
|---|---|
| Access Protocol | CSMA/CA (Carrier-sense Multiple Access with Collision Avoidance) |
| Duplexing method | Time Division Duplex (TDD) |
| Modulation | BPSK/QPSK/CCK/PBCC |
| Error Correction | Rate ½ K = 7 Convolutional Code for PBCC |
| Spreading | Baker |
| Chip Rate | 11 Mcps |
| Frame length | Various |
| Processing Gains | 11 at 1, 2 Mbps |
| Bearer Rates | 1, 2, 5.5 11 Mbps |
| High Rate Mode | CCK, PBCC |

Figure 5A:
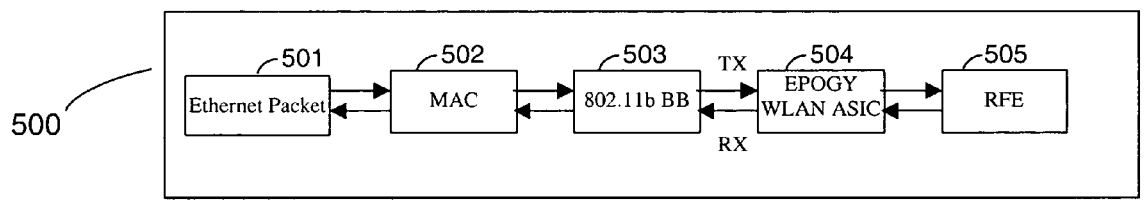
FIG. 5A is a depiction of a signal path employed in preferred embodiments of the present invention.
Figure 5B:
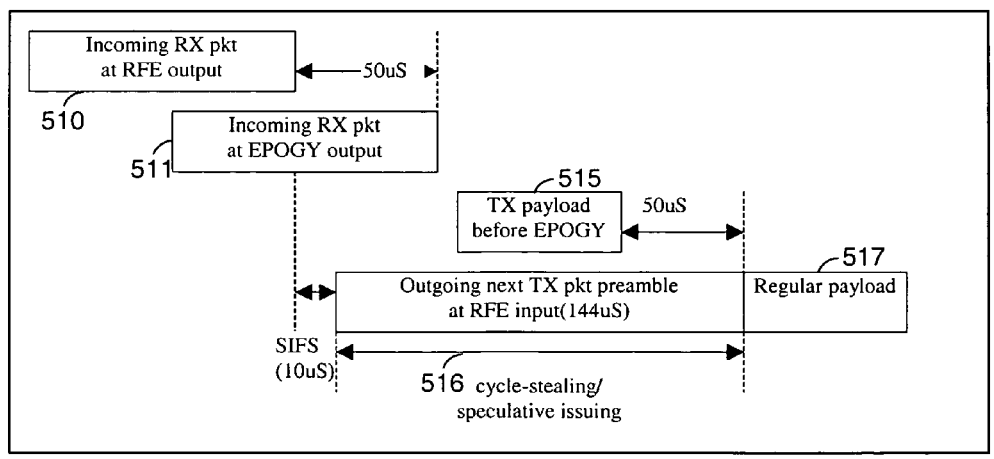
FIG. 5B is a timing diagram illustrating a preferred embodiment of a cycle stealing technique implemented in accordance with the present teachings.
Figure 5C:
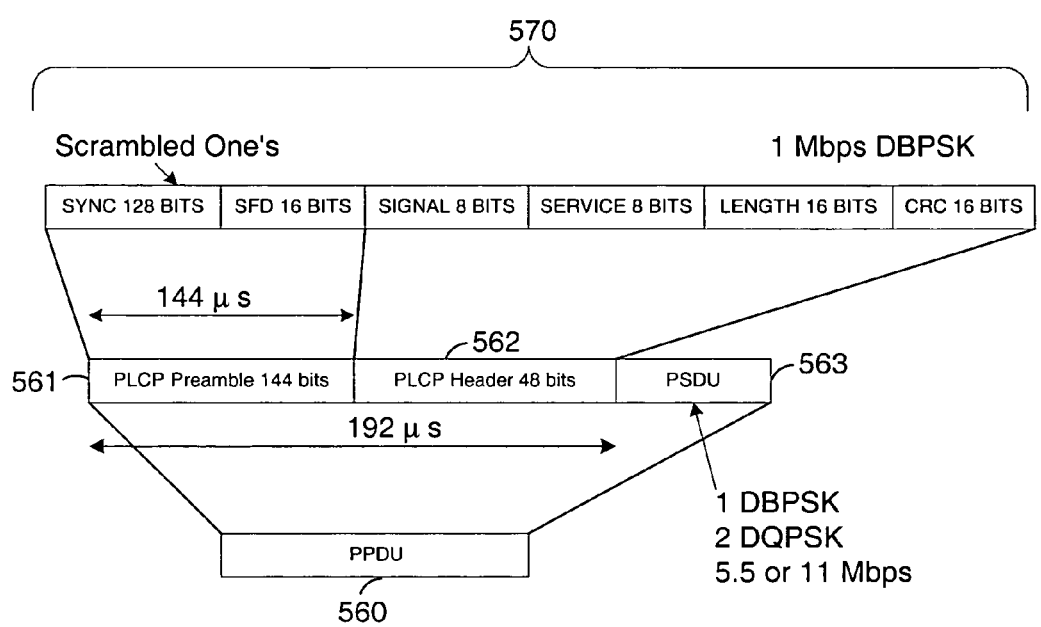
FIG. 5C is a simplified depiction of a packet format used in certain embodiments of the present invention.

FIG. 5C shows a frame structure of the 802.11b DSSS physical layer. The format for an interoperable (long) PPDU 560, includes a High Rate PLCP preamble 561, a High Rate PLCP header 562, and SDU 563. PLCP preamble 561 contains the following fields: synchronization (Sync) and start frame delimiter (SFD). PLCP header contains the following fields: signaling (SIGNAL), service (SERVICE), length (LENGTH), and CCITT CRC-16. All of these subfields are designated generally as 570 in FIG. 5C.

Each of these fields is described in detail in 18.2.3. The format for PPDU 560, including long High Rate PLCP preamble 561, long High Rate PLCP header 562, and PSDU 563, do not differ from IEEE Std 802.11, 1999 Edition for 1 Mbit/s and 2 Mbit/s. The only exceptions are
a) The encoding of the rate in the SIGNAL field;
b) The use of a bit in the SERVICE field to resolve an ambiguity in PSDU length in octets, when the length is expressed in whole microseconds;
c) The use of a bit in the SERVICE field to indicate if the optional PBCC mode is being used;
d) The use of a bit in the SERVICE field to indicate that the transit frequency and bit clocks are locked.

Operation of the Claimed Invention

The intention of the present invention is to realize an added-on scalable architecture through multi-transceiver to dramatically increase the performance of an 802.11b system. As noted earlier, a typical throughput of an 802.11b system under various propagation conditions is shown in FIG. 6D.

The bars in FIG. 6B represent the range and data rate of a typical 802.11b system under such conditions. The performance of an 802.11b WLAN Access Point 300 can be greatly improved through multi-antenna reception as shown in FIG. 6C.

In a preferred method, an enhanced receiver portion 350 and a standard receiver 380 will operate simultaneously in an AP. When an STA is in a first region, within a certain range of an AP, a communication link is established between such AP and STA through a standard 802.11b chip set (i.e. a conventional baseband processor 380) as long as the AP satisfies a link through-put (data rate).

The enhancement function of the present invention can kick in and be selectively activated whenever a STA moves to a second region which is beyond the first range, or if there is only a low data rate available in the first region due to the poor reception. The multi-antenna processor 350 can estimate the channel conditions (such as by using a frame of data which a standard 802.11b chip set can not decode) and then subsequently transmit data mainly under a point coordination function (PCF) mode.

The PCF mode provides for contention-free frame transfers. To achieve this, a point coordinator (PC) is set to reside in AP 300; this is a standard option under 802.11x protocols.

All STAs inherently obey the medium access rules of the PCF, because these rules are based on the DCF, and they set their Network Allocation Vector (NAV) at the beginning of each CFP. The operating characteristics of the PCF mode are such that all STAs are able to operate properly in the presence of a BSS in which a PC is operating, and, if associated with a point-coordinated BSS, are able to receive all frames sent under PCF control.

It is also an option for a STA to be able to respond to a contention-free poll (CF-Poll) received from a PC. A STA that is able to respond to CF-Polls is referred to as being CF-Pollable, and may request to be polled by an active PC. CF-Pollable STAs and the PC do not use RTS/CTS in the CFP.

When polled by the PC, a CF-Pollable STA may transmit only one MPDU, which can be to any destination (not just to the PC), and may "piggyback" the acknowledgment of a frame received from the PC using particular data frame subtypes for this transmission. If the data frame is not in turn acknowledged, the CF-Pollable STA shall not retransmit the frame unless it is polled again by the PC, or it decides to retransmit during the CP. If the addressed recipient of a CF transmission is not CF-Pollable, that STA acknowledges the transmission using the DCF acknowledgment rules, and the PC retains control of the medium. A PC may use contention-free frame transfer solely for delivery of frames to STAs, and never to poll non-CF-Pollable STAs.

Preamble acquisition is performed by the multi-antenna processor 350 to line up an FFT frame with an incoming data stream. After the preamble acquisition, the FFT frame in the SYNC of the preamble will provide the channel estimation of the following separation and combining.

As shown in FIG. 5A, an 802.11b transceiver with the multi-antenna processor 504 is located in data path between a baseband processor 503 and RFE 505, before a received data packet is passed from MAC 502 to Ethernet packet 501. Since an average of 50 uS is introduced in a RX data path (as a result of processing time required for FFT computations on the multiple received data signals) a special "cycle-stealing" technique is applied to avoid violating IEEE 802.11 SIFS or PIFS timing requirements.

As shown in FIG. 5B, an incoming received packet 510 is output from RFE 321. To process such packet, a multi-antenna processor 350 of the present invention requires about 50 us before it will appear as a processed received packet 511. This period is too long to meet an 802.11b protocol; this latency may also affect similar wireless transmission protocols.

Therefore, to mask this latency, the present invention issues a 144 microsecond transmit packet preamble 516 at a predetermined time period (in an 802.11 protocol SIFS(10 uS)) after the end of previous RX packet 510. Thus, this transmit preamble is issued before RX packet 510 is fully decoded. This is an acceptable solution because, as noted below, in a contention free protocol, an AP can determine in advance that it is required to reply to a received packet. Therefore the 802.11 SIFS timing can be maintained.

Because of this and other unique aspects of the present invention, it may be desirable in some applications to enable multi-antenna processor 350 to operate all the time, or only at selected times, such as only for transmitting, or only for receiving.

Again, the reasons for the potential timing violation exist in an 802.11x protocol, because for certain types of short 802.11 frames, a "Destination Address field" (DA) within the incoming RX packet may not be decoded in time for the AP decide to start sending. The same is true for a "Frame Type" field. It will be apparent to those skilled in the art that this feature, therefore, may not be required in other protocols with less stringent timing requirements, and, correspondingly, that such function may be advantageous in other wireless protocols which do use an extremely tight response timing window.

Accordingly, as indicated above, a preferred operation mode for the present invention in an 802.11x environment is to set an AP to use a Point Coordination Function (PCF) mode. Under the PCF, a contention free period (CFP) is established on the medium. The PCF-capable AP starts the contention free period with a beacon frame, then all the STA can only access the medium after they are "polled" by the AP.

In this fashion, the access sequences on the mediums can be easily determined beforehand by an AP. For example, AP-STA1-AP-STA2-AP-STA3-AP-AP-STA4. Note that under this condition, there is no two consecutive STA access on the medium, therefore safe "speculative issiung" can be assumed by the AP.

The present invention, therefore, does not operate under a basic DCF (distributed coordination function) mode, since under this mode, there is no pre-defined sequences for the "cycle-stealing" issuing to reference. Although the receive path can be active at all times (parellel to an 11b RX path w/o a multisignal processing delay), the TX path should not be active. Note that in some applications, it may be possible to process an initial received packet using a conventional baseband processor during an initialization or handshake period, and then switch to the multi-antenna receive path during a later time. The specific implementation details will vary from application to application.

Other Considerations

Because of the special "TX wave beaming" capability of the present invention, the multi-antenna processor 350 helps to transmit TX, packet to further recipient(s) at a specific locations instead of all recipients within a particular gular 802.11b TX range. Special considerations should be taken, therefore, for following situations:

Authentication and Association

Before any STA can associate with an AP, the STA has to authenticate and then associate with the APs by sending out "Authentication" or "association" packets. These packets may be sent by a STA that is out of a regular 802.11b range to an AP 300 of the present invention during a contention period (CP). As noted earlier, the enhanced AP 300 is preferably configured to respond to distant STAs in the subsequent contention-free period (CFP).

To address this scenario, the present invention can utilize timers (not shown) which cause AP 300 to enter a CFP mode early to respond to such distant STA. Alternatively, an AP of the present invention could be configured to treat these requests as a high priority request so that a CFP mode is established quickly to respond. In another approach, the CFP/CP alternating ratio can be adjusted dynamically to accommodate for a mix of STAs at different locations.

Multiple Destination Transmission

Beacon frame, broadcast, and multicast are typical packets targeted for multiple destinations (STAs). For multiple targets spreading across different directions, "multiple sending of the same payloads" method may be employed, i.e., using a conventional baseband 802.11b transmitter to do multicasting transmission first to all the "in range" targets, then followed by location-specified transmissions (using the enhancement of the present invention) sent to other "out of regular 802.11b" range targets.

Additional Embodiments

Figure 7:
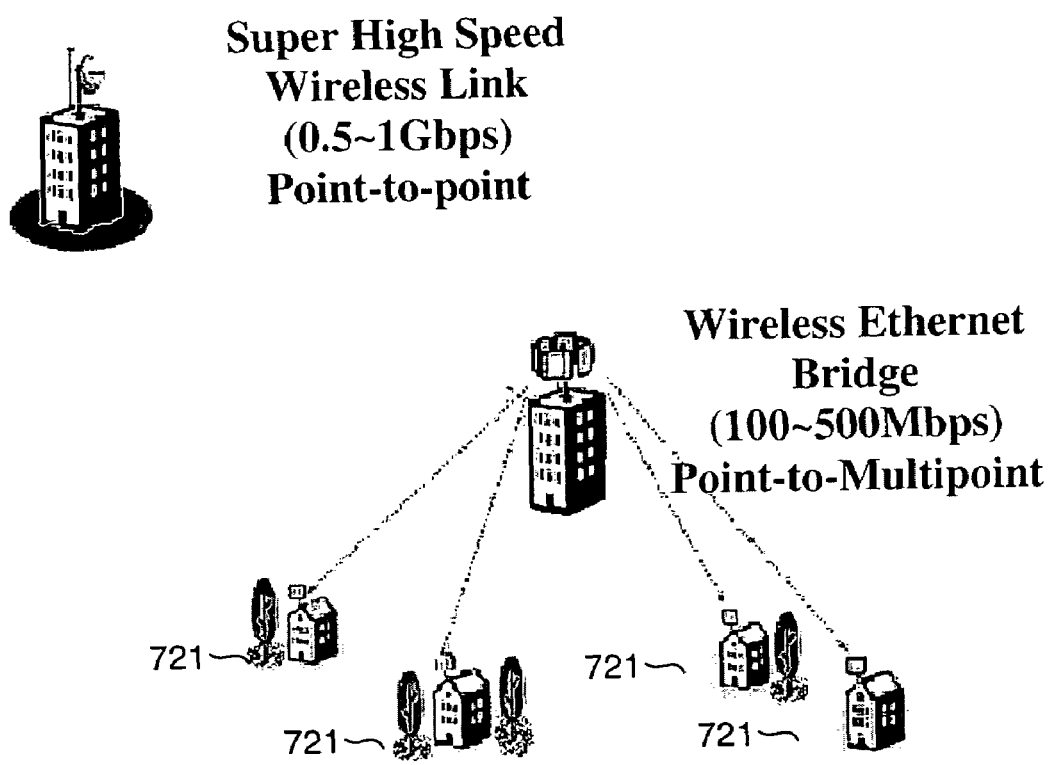
FIG. 7 is a block diagram of a preferred embodiment of a high speed wireless link system implemented in accordance with the present teachings.

For reasons which will be apparent to those skilled in the art from reading the present disclosure, the present invention can be easily implemented in other wireless LAN environments. As shown in FIG. 7 for example, a very high speed wireless system 700 based on an 802.16 protocol uses a wireless point to point link between two access points 710 and 720. The latter can be an Ethernet Bridge communicating with a variety of home wireless transceivers. Furthermore, with minor modifications and routine design skills, the enhancement methods of the present invention can be incorporated within an 802.11a WLAN, which at this time appear to be in more of a need for a radius enhancement.

Monitoring System

As noted above, security systems often rely on wireless camera technologies to monitor areas. These wireless camera systems suffer from the same basic limitations as the 802.11x systems discussed above, namely range limitations, interference, frequency fading, etc. For this reason, the present invention could be beneficially employed in such environments as well.

Figure 8:
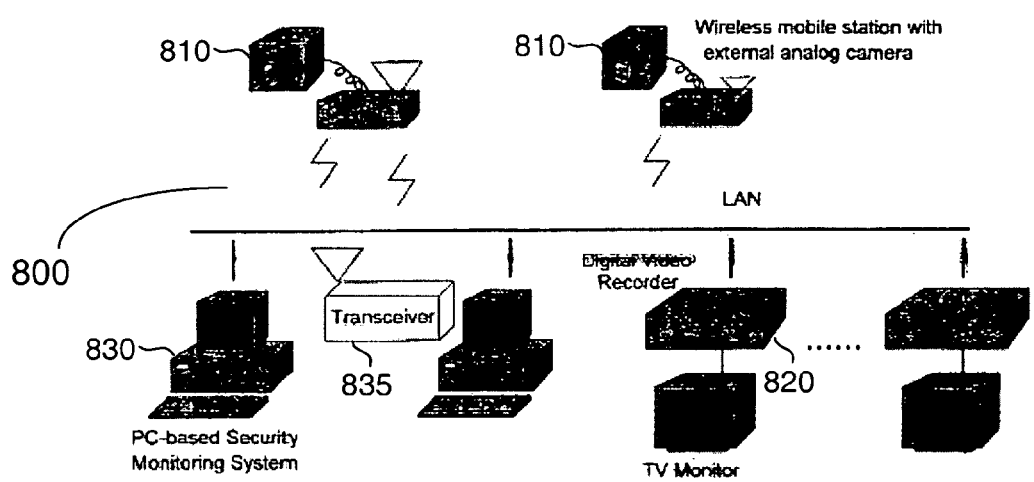
FIG. 8 is a block diagram of a preferred embodiment of a wireless monitoring system implemented in accordance with the present teachings.

FIG. 8 is a block diagram of a preferred embodiment of a wireless monitoring system 800 implemented in accordance with the present teachings. As seen therein, one or more wireless mobile stations with an external camera (analog or digital) 810 transmit to a transceiver 835 coupled to a LAN. The transceiver 835, in this instance, is a multi-antenna based system as described above, which, for the reasons mentioned, affords a significantly larger operating range. The wireless data transmission (typically video and/or audio data) is monitored by a PC based security system 830. The remote monitored data can also be displayed on a monitor 820, and stored for archiving purposes on a digital video recorder 825. Those skilled in the art will appreciate that system 800 may or may not use an 802.11x based protocol, depending on the particular performance requirements.

Figure 9A:
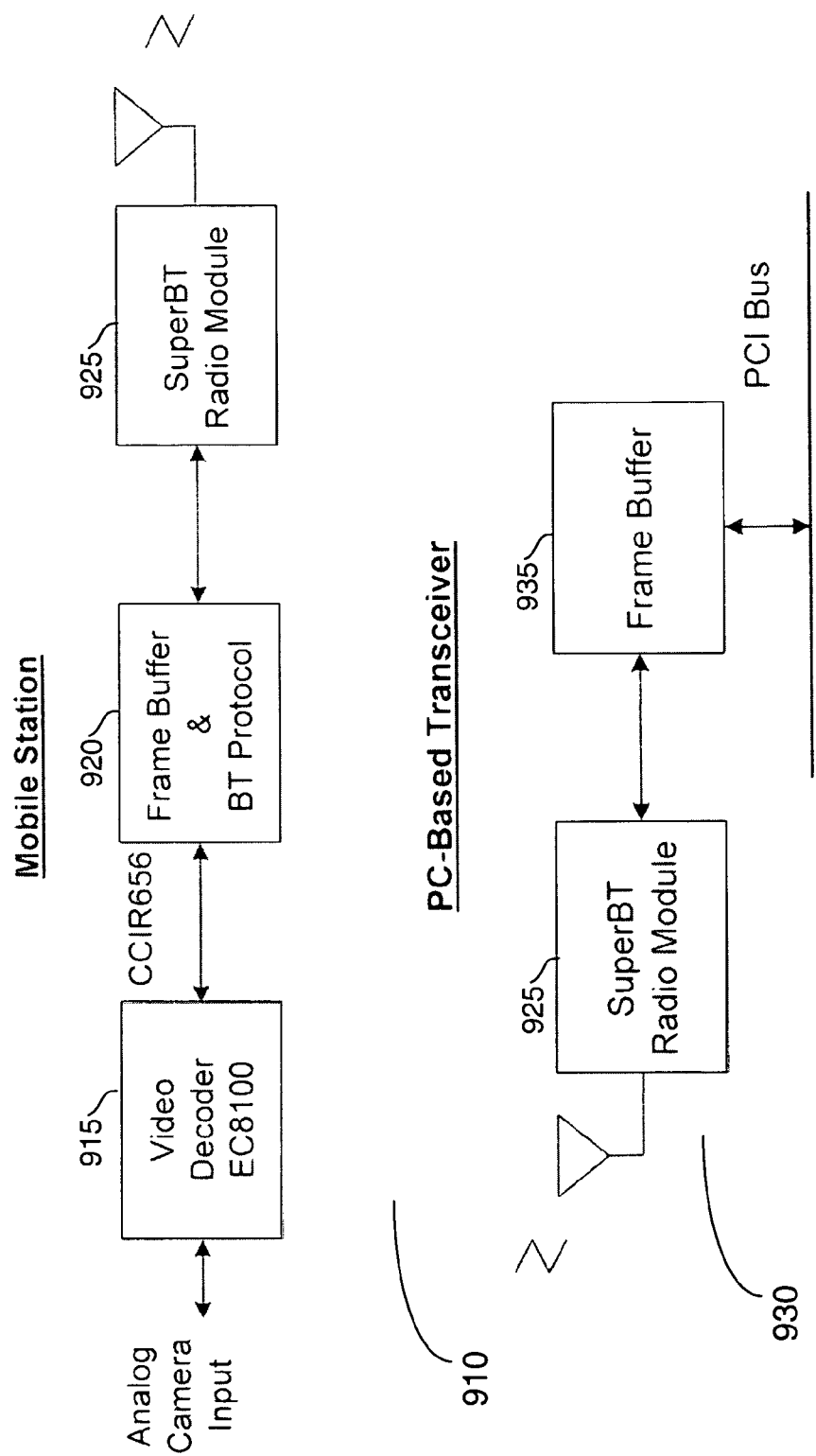
FIG. 9A is a block diagram of a certain components used in the preferred embodiment FIG. 8.

FIG. 9A is a block diagram of some of the key components used in the system of FIG. 8, including a mobile station 910, and a PC-based transceiver 930. A video decoder chip 915 accepts industry standard video inputs and converts to digital format. In a preferred approach this chip is a true progressive-scan NTSC/Pal with built in A/D converters. Auto NTSC/Pal detection, CCIR 601 and square IXEL operation, 8 or 16 bit 4:2:2 Y CbCr and (5,5,5) or (5,6,6) RGB, linear and gamma corrected, and VBI data capture to support closed caption, wide screen and teletext. Philips makes a part designated 7111, which could be used in this instance. A frame buffer and BT protocol circuit 920 then prepares the video data for transmission, and sends it to a radio module 925. This module may or may not be a multi-antenna based transmitter, depending on system requirements, although it is preferred to use a multi-antenna architecture for the reasons noted above.

The PC based transceiver 930 is coupled to a conventional PC PCI bus, and includes a similar radio module 925, and frame buffer 935. Again, in a preferred embodiment, radio module 925 is a multi-antenna based processor as noted above.

Figure 9B:
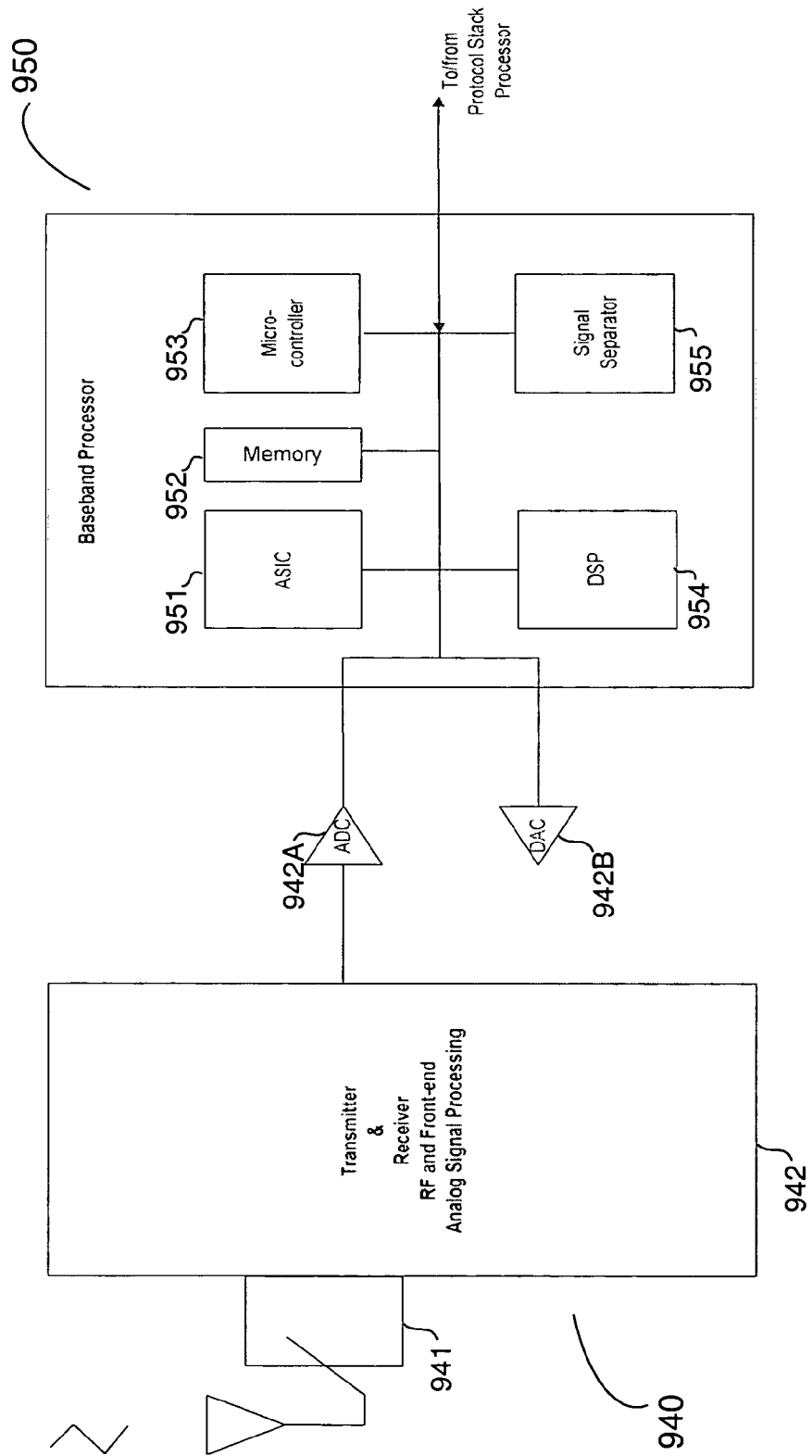
FIG. 9B is a block diagram of a radio module transceiver used in the preferred embodiment FIG. 8.

FIG. 9B is a block diagram of a radio module transceiver used in the preferred embodiment of FIG. 8. Both transmitter and receiver 925, 935 include an antenna section 941, an RF front end 942, and A/D and D/A stages 942A and 942B respectively. Received data signals are then processed by a baseband processor 950, which is based on multi-antenna processor 350 described above. Only some of the components are illustrated for explanatory purposes. Thus, such transceiver includes an ASIC 351, memory 952, a microcontroller 953, a DSP 954, and a signal separator 955.

Figure 9C:
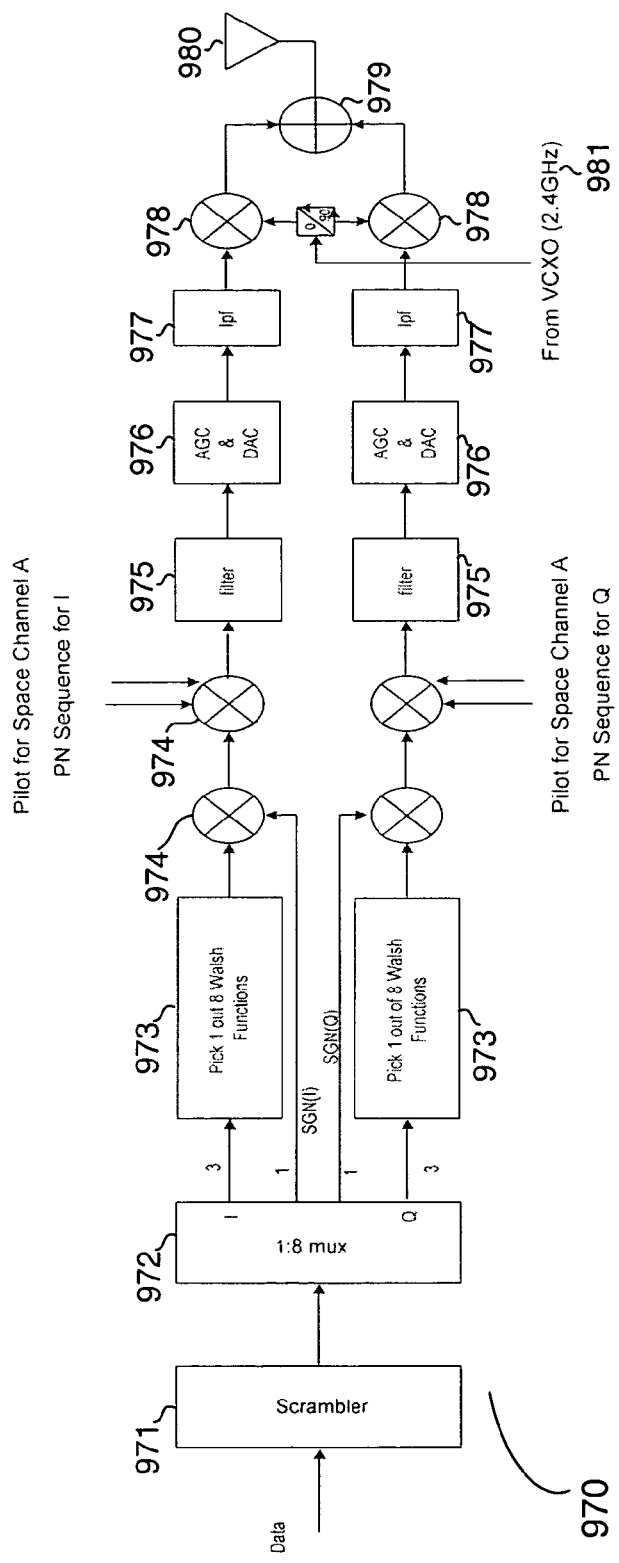
FIG. 9C is a block diagram of a radio module transmitter used in the preferred embodiment FIG. 8.

FIG. 9C is a block diagram of a radio module transmitter 970 used in the preferred embodiment FIG. 8. This transmitter 970 includes a number of components as shown in this figure, including a data scrambler 971, multiplexer 972, Walsh function circuit 973, pilot signal section 974, gain control and DAC section 976, low pass filters 977, mixers 978, adder 979 and antenna 980. A clock signal is provided at 981.

Figure 9D:
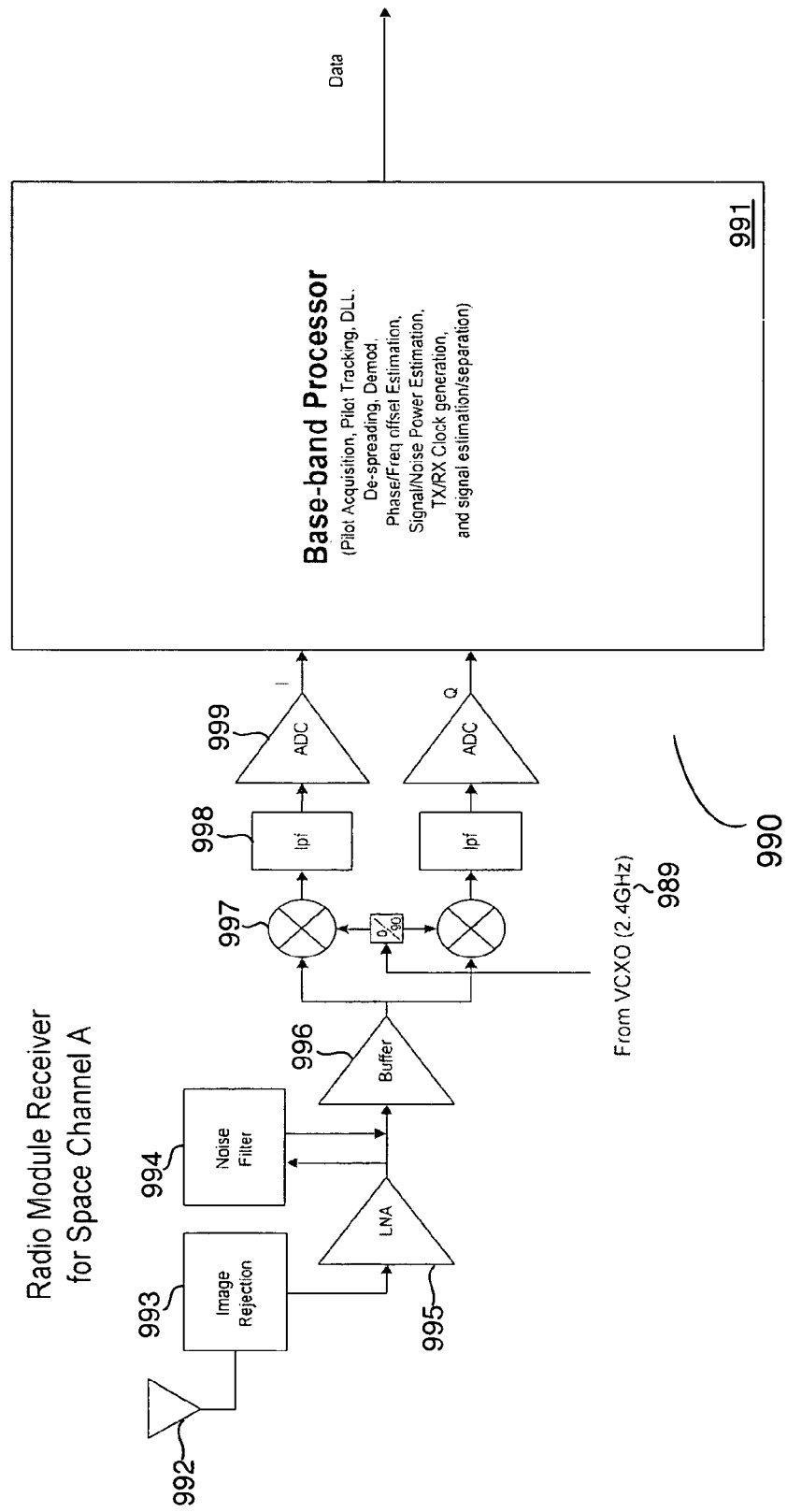
FIG. 9D is a block diagram of a radio module receiver used in the preferred embodiment FIG. 8.

FIG. 9D is a block diagram of a radio module receiver 990 used in the preferred embodiment of FIG. 8. This receiver 990 includes a number of components as shown in this figure, including an antenna 992, an image rejection circuit 993, LNA circuit 995, noise filter 994, buffer 996, and mixer section 997, which is coupled to a low pass filter 998 and A/D section 999. A clock signal is provided at 989. Baseband processor 991 includes a multi-antenna processor as noted above, and receives data from multiple antenna feeds. It further includes a number of conventional components known to those skilled in the art indicated in FIG. 9D.

Those skilled in the art will appreciate that the above invention could see significant use in many environments such as casinos, banks, airports, retail stores, commercial buildings, small business, warehouse, government, law enforcement, short-term events, and seasonal displays.

It will be apparent to those skilled in the art that the present discussion is simplified to better focus on the key structures and operations of the present invention, and that other supporting circuits will be used in many commercial applications. It will be further understood that such other circuits, functions and features could be included with system 300 without deviating from the teaching of the present invention. Finally, the individual component circuits described above can be implemented without undue experimentation by a skilled artisan using any of a variety of combinations of logic circuitry known in the art that are suitable for use in an integrated circuit to effectuate such functions. Other variations, including non-analog versions, will also be apparent from the present teachings.

Other techniques for implementing the invention will be apparent to those skilled in the art, and the present invention is not limited by such considerations. Accordingly, the particular details can be determined for any particular architecture and can be implemented in the same in silicon form with conventional techniques known to those skilled in the art, such as through routine simulations, process experiments, etc.

While the invention has been described with reference to illustrative embodiments, this description is not intended to be construed in a limiting sense. It will be clearly understood by those skilled in the art that foregoing description is merely by way of example and is not a limitation on the scope of the invention, which may be utilized in many types of integrated circuits made with conventional processing technologies. Various modifications and combinations of the illustrative embodiments, as well as other embodiments of the invention, will be apparent to persons skilled in the art upon reference to the description. Such modifications and combinations, of course, may use other features that are already known in lieu of or in addition to what is disclosed herein. It is therefore intended that the appended claims encompass any such modifications or embodiments. While such claims have been formulated based on the particular embodiments described herein, it should be apparent the scope of the disclosure herein also applies to any novel and non-obvious feature (or combination thereof) disclosed explicitly or implicitly to one of skill in the art, regardless of whether such relates to the claims as provided below, and whether or not it solves and/or mitigates all of the same technical problems described above. Finally, the applicants further reserve the right to pursue new and/or additional claims directed to any such novel and non-obvious features during the prosecution of the present application (and/or any related applications).

What is claimed is:

1. A closed circuit broadcast security receiver comprising: a data receiving device adapted for receiving video data from a radio module transmitter configured at a first location to be monitored, said first data receiving device including: a multi-antenna signal processing circuit being further adapted to: (a) receive M independent RF modulated input signals from said radio module transmitter and other radio module transmitters representing said video data; and (b) process said M independent RF modulated input signals using a channel mixing matrix and a signal from a second multi-antenna signal processing circuit to extract said video data transmitted by said radio module transmitter and other radio module transmitters.

2. The closed circuit broadcast security receiver of claim 1, wherein said multi-antenna signal processing circuit is enabled and selectively operates in a second mode when channel conditions indicate that a data rate in said channel has fallen below a predetermined threshold.

3. The closed circuit broadcast security receiver of claim 1, wherein said multi-antenna signal processing circuit is enabled and selectively operates in response to a determination that a data rate in said channel is to be enhanced above a nominal operating rate.

4. The closed circuit broadcast security receiver circuit of claim 1, wherein said multi-antenna signal processing circuit is enabled and selectively operates in response to a determination that there is noise and/or interference in said channel.

5. The closed circuit broadcast security receiver circuit of claim 1, wherein said multi-antenna signal processing circuit is compatible with an 802.11x communications protocol.

6. The closed circuit broadcast security receiver circuit of claim 1 wherein said multi-antenna signal processing circuit is configured as a multiple-in, multiple out (MIMO) processor.

7. The closed circuit broadcast security receiver circuit of claim 1, wherein said multi-antenna signal processing circuit demodulates a data stream transmitted using multiple independent antennas which each transmit a portion of said data stream, which data stream represents captured video from N separate radio module transmitters.

8. The closed circuit broadcast security receiver circuit of claim 1, wherein said multi-antenna signal processing circuit generates a speculative response to ensure that said data receiving device complies with timing requirements of a communications protocol.

9. The closed circuit broadcast security receiver circuit of claim 8, wherein said timing requirements are associated with an 802.11x compatible data link.

10. A closed circuit video system comprising: a first data capture device for monitoring and capturing video data from a first location; said first data capture device further including a radio module transmitter to transmit said data to a second data storage location; a first data receiving device at a second separate location for receiving said video data from said radio module transmitter, said first data receiving device including: a multi-antenna signal processing circuit being further adapted to: (a receive M independent RF modulated input signals from said radio module transmitter and other radio module transmitters representing said video data; and (b process said M independent RF modulated input signals using a channel mixing matrix and a signal from a second multi-antenna signal processing circuit to extract said video data transmitted by said radio module transmitter and other radio module transmitters; a data storage device for storing said video data captured from said first monitored location and transmitted to said first data receiving device.

11. The closed circuit video system of claim 10, wherein said first data capture device is used as part of a security system.

12. The closed circuit video system of claim 10, wherein said multi-antenna signal processing circuit is incorporated within a personal digital assistant.

13. The closed circuit video system of claim 10, wherein said first data capture device is a digital camera.

14. The closed circuit video system of claim 10, wherein said multi-antennal signal processing circuit receives and processes video data from N radio module transmitters simultaneously.

15. The closed circuit video system of claim 10 wherein said radio module transmitter is configured to transmit said RF modulated signals selectively to said second separate location.

16. The closed circuit video system of claim 10 wherein said first data capture device transmits said video data using N separate antennas simultaneously as N separate bit streams.

17. The closed circuit video system of claim 10, wherein said signal from a second multi-antenna signal processing circuit comprises a recovered data signal.

18. A radio frequency (RF) multi-antenna video data receiver implemented in a single chip integrated circuit chip (IC) comprising: a multi-antenna signal processing circuit within the single chip IC being adapted to: (a) receive M independent RF modulated input signals from N separate video camera radio module transmitters, where N>1; and (b) simultaneously process said M independent RF modulated input signals using a channel mixing matrix and a signal from a second multi-antenna signal processing circuit to extract N video data signals transmitted by said N separate video camera radio module transmitters; wherein said multi-antenna signal processing circuit is operated selectively to enhance an operating transmission range and/or an operating data rate of one or more separate baseband processors which also receive video data from said N separate video camera radio module transmitters.

19. The RF multi-antenna video data capture system of claim 18, wherein said multi-antenna signal processing circuit processes at least 4 separate input signals representing a data stream multiplexed over 4 separate bit streams.

20. The RF multi-antenna access point system of claim 18, wherein space division multiple access is realized by separating different RF signals from different signal paths simultaneously in the single chip IC.

21. The RF multi-antenna access point system of claim 18, wherein a localized encryption is achieved by independently controlling an energy modulation of separate transmission antennas used simultaneously by each of said M separate transmission signals, so that data signals received by unintended recipients are indistinguishable from noise.

22. The RF multi-antenna video data capture system of claim 18, wherein said signal from a second multi-antenna signal processing circuit comprises a recovered data signal.

23. An apparatus comprising:
a first data receiving circuit capable receiving data; and
a multi-antenna signal processing circuit capable of:
monitoring channel conditions;
operating in a first mode;
receiving M independent signals representing the data; and
processing the M independent signals using a channel mixing matrix and a signal from a second multi-antenna signal processing circuit to extract the data.

24. An apparatus according to claim 23, wherein the multi-antenna signal processing circuit is capable of operating in a second mode in response to channel conditions indicating that a data rate in the channel has fallen below a predetermined threshold.

25. An apparatus according to claim 23, wherein the multi-antenna signal processing circuit is capable of operating in a second mode in response to a determination that a data rate in the channel is to be enhanced above a nominal operating rate.

26. An apparatus according to claim 23, wherein the multi-antenna signal processing circuit is enabled and selectively operates in a second mode in response to a determination that there is noise and/or interference in the channel.

27. An apparatus according to claim 23, wherein the multi-antenna signal processing circuit is compatible with an 802.11x communications protocol.

28. An apparatus according to claim 23, wherein the multi-antenna signal processing circuit is configured as a multiple-in, multiple out (MIMO) processor.

29. An apparatus according to claim 23, wherein the multi-antenna signal processing circuit is capable of demodulating a data stream transmitted using multiple independent antennas which transmit a portion of the data stream, which data stream represents captured video from N separate radio module transmitters.

30. An apparatus according to claim 23, wherein the data is video data.

31. The apparatus according to claim 23, wherein said signal from a second multi-antenna signal processing circuit comprises a recovered data signal.

32. A system comprising:
a first data monitoring and capturing circuit capable of receiving data from
a first location;
a transmitter to transmit the data to a second location;
a first data receiving circuit at the second location for receiving the data;
a multi-antenna signal processing circuit capable of:
receiving M independent modulated signals representing the data; and processing the M independent modulated signals using a channel mixing matrix and a signal received from a second multi-antenna signal processing circuit to extract the data; and a data storage circuit capable of storing the data.

33. A system according to claim 32, wherein the first data monitoring and capturing circuit is part of a security system.

34. A system according to claim 32, wherein the multi-antenna signal processing circuit is incorporated within a personal digital assistant.

35. A system according to claim 32, wherein first data monitoring and capturing circuit is a digital camera.

36. A system according to claim 32, wherein the multi-antenna signal processing circuit is capable of receiving and processing data from N radio module transmitters simultaneously.

37. A system according to claim 32, wherein first data monitoring and capturing circuit is capable of transmitting the data using N separate antennas simultaneously as N separate bit streams.

38. A system according to claim 32, wherein the multi-antenna signal processing circuit is capable of processing at least 4 separate input signals representing a data stream multiplexed over 4 separate bit streams.

39. A system according to claim 32, implemented in a single chip integrated circuit.

40. A system according to claim 32, wherein a localized encryption is capable of being enabled by independently controlling an energy modulation of separate transmission antennas used simultaneously or nearly simultaneously by the M separate modulated signals.

41. The system according to claim 32, wherein said signal from a second multi-antenna signal processing circuit comprises a recovered data signal.

42. The closed circuit broadcast security receiver of claim 1, wherein said signal from a second multi-antenna signal processing circuit comprises a recovered data signal.

* * * * *

UNITED STATES PATENT AND TRADEMARK OFFICE
CERTIFICATE OF CORRECTION

PATENT NO. : 7,389,096 B2
APPLICATION NO. : 10/820963
DATED : June 17, 2008
INVENTOR(S) : Shaolin Li Page 1 of 1

It is certified that error appears in the above-identified patent and that said Letters Patent is hereby corrected as shown below:

Col. 20, Claim 21 should read as follows:

21. An apparatus comprising:

a first data receiving circuit to receive data; and a multiple-antenna signal processing circuit to:

monitor channel conditions;

operate in a first mode;

receive M independent signals representing the data; and process the M independent signals using a channel mixing matrix and a signal from a second multi-antenna signal processing circuit to extract the data.

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,389,096 B2 Page 1 of 1
APPLICATION NO. : 10/820963
DATED : June 17, 2008
INVENTOR(S) : Shaolin Li It is certified that error appears in the above-identified patent and that said Letters Patent is hereby corrected as shown below:

Col. 20, Claim 21, lines 5-10 should read as follows:

21. An apparatus comprising:

a first data receiving circuit to receive data; and a multiple-antenna signal processing circuit to:

monitor channel conditions;

operate in a first mode;

receive M independent signals representing the data; and process the M independent signals using a channel mixing matrix and a signal from a second multi-antenna signal processing circuit to extract the data.

This certificate supersedes the Certificate of Correction issued August 12, 2008.

Signed and Sealed this

Sixteenth Day of September, 2008

JON W. DUDAS
*Director of the United States Patent and Trademark Office*